US011074206B1

(12) United States Patent
Jalal et al.

(10) Patent No.: US 11,074,206 B1
(45) Date of Patent: Jul. 27, 2021

(54) MESSAGE PROTOCOL FOR A DATA PROCESSING SYSTEM

(71) Applicant: Arm Limited, Cambridge (GB)

(72) Inventors: Jamshed Jalal, Austin, TX (US); Tushar P Ringe, Austin, TX (US); Kishore Kumar Jagadeesha, Austin, TX (US); Ashok Kumar Tummala, Cedar Park, TX (US); Rishabh Jain, Austin, TX (US); Devi Sravanthi Yalamarthy, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/036,225

(22) Filed: Sep. 29, 2020

(51) Int. Cl.
*G06F 13/28* (2006.01)
*G06F 13/40* (2006.01)
*G06F 9/46* (2006.01)

(52) U.S. Cl.
CPC ............. *G06F 13/28* (2013.01); *G06F 9/466* (2013.01); *G06F 13/409* (2013.01); *G06F 13/4013* (2013.01); *G06F 13/4045* (2013.01); *G06F 13/4059* (2013.01); *G06F 13/4068* (2013.01)

(58) Field of Classification Search
CPC .. G06F 13/28; G06F 13/4013; G06F 13/4045; G06F 13/4059; G06F 13/4068; G06F 13/409; G06F 9/466
USPC .......................................................... 710/35
See application file for complete search history.

(56) References Cited

U.S. PATENT DOCUMENTS 9,378,049 B1 * 6/2016 Johnson .............. G06F 13/4068
10,019,546 B1 * 7/2018 Staler ...................... G06F 30/39
10,628,355 B2 * 4/2020 Jalal ..................... G06F 13/1626
10,643,707 B2 * 5/2020 Rajamani ............... G06F 3/0679
10,942,878 B1 * 3/2021 Salisbury ................ G06F 13/28
2007/0204076 A1 * 8/2007 Arulambalam ......... G06F 13/28
 710/35
2011/0072173 A1 * 3/2011 Holty ...................... G06F 13/24
 710/52
2021/0058335 A1 * 2/2021 Ringe ................. H04L 12/4633

OTHER PUBLICATIONS

"AMBA moves forward with major revisions to AXI and CHI specifications"—by Francisco Socal, Dated Oct. 15, 2019; 9 pages; https://community.arm.com/developer/ip-products/processors/b/processors-ip-blog/posts/updates-to-amba-axi-and-chi-specifications (Year : 2019).*

* cited by examiner

*Primary Examiner* — Brian T Misiura
(74) *Attorney, Agent, or Firm* — Leveque Intellectual Property Law, P.C.

(57) ABSTRACT

The present disclosure advantageously provides a method and system for transferring data over at least one interconnect. A request node, coupled to an interconnect, receives a first write burst from a first device over a first connection, divides the first write burst into an ordered sequence of smaller write requests based on the size of the first write burst, and sends the ordered sequence of write requests to a home node coupled to the interconnect. The home node generates an ordered sequence of write transactions based on the ordered sequence of write requests, and sends the ordered sequence of write transactions to a write combiner coupled to the home node. The write combiner combines the ordered sequence of write transactions into a second write burst that is the same size as the first write burst, and sends the second write burst to a second device over a second connection.

20 Claims, 21 Drawing Sheets

MESSAGE PROTOCOL FOR A DATA PROCESSING SYSTEM

BACKGROUND

The present disclosure relates to a data processing system. More particularly, the present disclosure relates to a message protocol for a data processing system.

A data processing system may be arranged as a system-on-chip (SoC) that includes various components that are connected by an interconnect. Generally, certain components process data, such as, for example, processors, processor clusters, graphic processors, etc., while other components send data to, and receive data from, the data processing components, such as, for example, memory controllers, input/output (I/O) controllers, etc. The data provisioning components may be connected to on-chip or off-chip memory, data buses, wired or wireless networks, etc. The interconnect provides the network infrastructure over which data transactions between components are conveyed.

An interconnect may implement packet-based communication with a request-response-retry message protocol. Generally, a requester is a component that initiates a transaction or request over the interconnect, and a completer is a component that responds to the request over the interconnect. Additionally, the requester may receive the request from a master device that is connected to the requester, and the completer may send the request to a slave device that is connected to the completer.

In this interconnect, if the transaction size of a request from the master device to the requester is larger than the maximum transaction size that is supported by the interconnect, the requester divides the request into several, smaller requests that are transmitted across the interconnect to the completer. The completer then issues a separate request to the slave device for each request that is received from the requester over the interconnect. Unfortunately, this limitation significantly reduces interconnect efficiency, performance and throughput, and increases message header overhead for requesters, completers and slave devices.

DETAILED DESCRIPTION

Figure 1A:
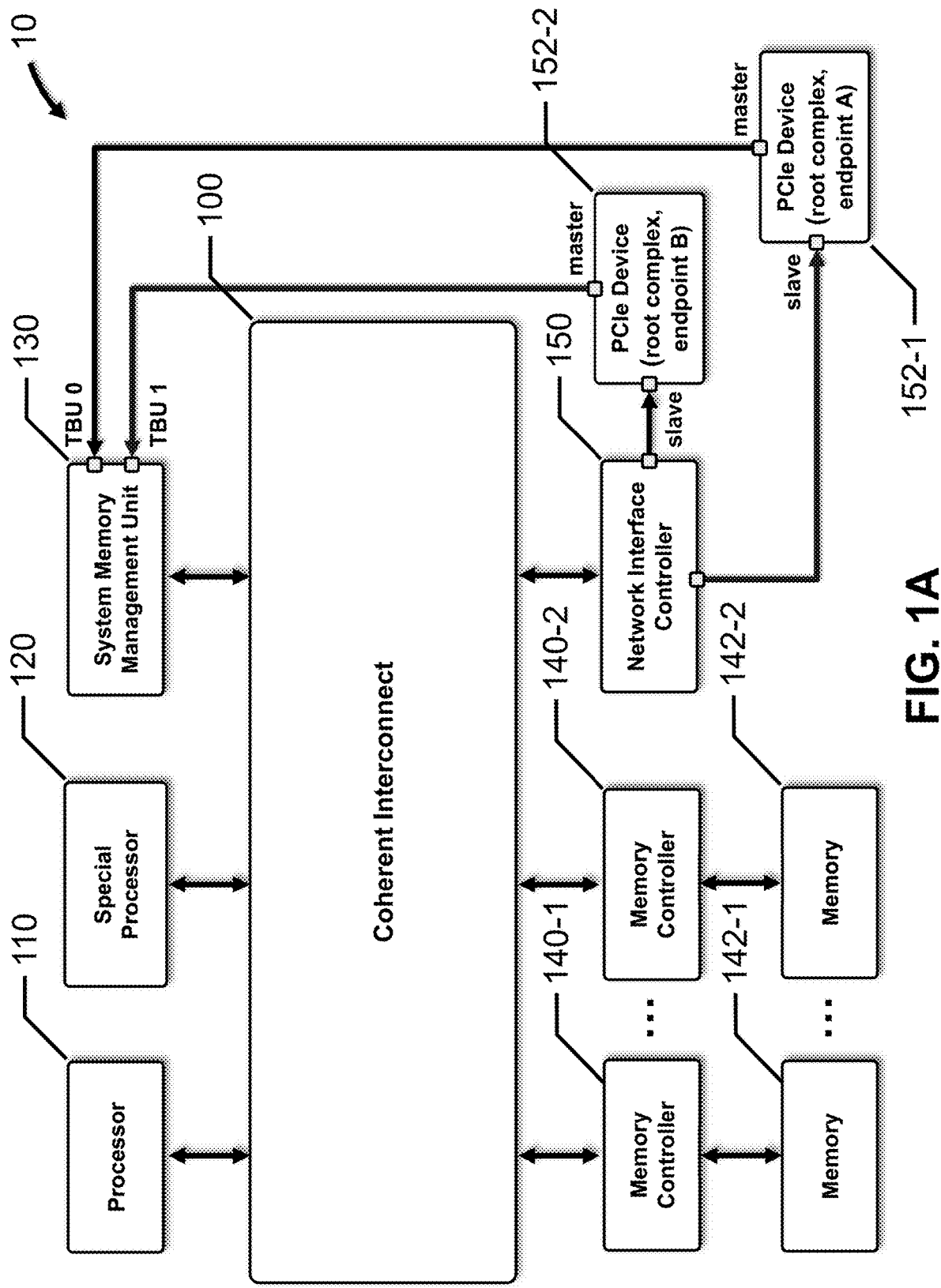
FIG. 1A depicts a block diagram for a SoC, in accordance with an embodiment of the present disclosure.

Embodiments of the present disclosure will now be described with reference to the drawing figures, in which like reference numerals refer to like parts throughout.

Embodiments of the present disclosure advantageously provide a high efficiency message protocol for a data processing system that includes one or more interconnects. While applicable to many message protocols that may pass through an interconnect, embodiments of the present disclosure advantageously improve the efficiency of PCIe peer-to-peer transactions, as discussed in detail below.

In one embodiment, a computer-based method for transferring data over at least one interconnect is provided. At a request node coupled to an interconnect: a first write burst is received from a first device over a first connection; the first write burst is divided into an ordered sequence of write requests based on the first write burst data size, the ordered sequence of write requests including at least a first write request and a last write request, each write request having a data size that is smaller than a first write burst data size; and the ordered sequence of write requests is sent to a home node coupled to the interconnect, the last write request including a last write identifier. At the home node: an ordered sequence of write transactions is generated based on the ordered sequence of write requests, the ordered sequence of write transactions including at least a first write transaction and a last write transaction, each write transaction having a data size equal to each write request data size; and the ordered sequence of write transactions is sent to a write combiner coupled to the home node, the last write transaction including the last write identifier. At the write combiner: the ordered sequence of write transactions is combined into a second write burst based on at least the last write identifier, the second write burst having a data size equal to the first write burst data size; and the second write burst is sent to a second device over a second connection.

FIG. 1A depicts a block diagram for SoC 10, in accordance with an embodiment of the present disclosure.

In this embodiment, SoC 10 includes interconnect 100 coupled to one or more processors 110, one or more accelerators or special processors 120, system memory management unit (SMMU) 130, one or more memory controllers 140-1, 140-2, etc., and network interface controller (NIC) device 150. Each memory controller 140-1, 140-2 is coupled to a respective memory 142-1, 142-2, which may be integrated on SoC 10 or externally connected. Peripheral component interconnect express (PCIe) devices 152-1, 152-2 are connected to both SMMU 130 and to NIC 150.

Interconnect 100 is a communication system that transfers data between processor 110, accelerator or special processor 120, SMMU 130, memory controllers 140-1, 140-2 and memories 142-1, 142-2, NIC device 150, and PCIe devices 152-1, 152-2, as well as other components. Certain components of SoC 10 may be classified as a particular type of interconnect protocol node, as discussed in more detail with respect to FIG. 1B.

Generally, interconnect 100 may include, inter alia, a shared or hierarchical bus, a crossbar switch, a packet-based serialized network-on-chip (NoC), etc. Interconnect 101, depicted in FIG. 2A, has a crossbar topology that provides an ordered network with low latency, and may be particularly suitable for a small-sized interconnect with a small number of protocol nodes, switches and wire counts. Interconnect 102, depicted in FIG. 2B, has a ring topology that balances wiring efficiency with latency, which increases linearly with the number of protocol nodes, and may be particularly suitable for a medium-sized interconnect. Interconnect 103, depicted in FIG. 2C, has a mesh topology that has more wires to provide greater bandwidth, is modular and easily scalable by adding more rows and columns of switches or routers, and may be particularly suitable for a large-sized interconnect.

In many embodiments, interconnect 100 is a coherent mesh network that includes multiple switches or router logic modules (routers) arranged in a two-dimensional rectangular mesh topology, such as, for example, the Arm CoreLink Coherent Mesh Network. In this example, the switches or routers are crosspoints (i.e., XPs). Each XP may connect up to four neighboring XPs using mesh ports, and may connect to one or two components (devices) using device ports. Additionally, each XP may support four coherent hub interface (CHI) channels to transport data from a source device to a destination or target device, as described, for example, in the Arm Advanced Microcontroller Bus Architecture (AMBA) CHI specification.

In these embodiments, interconnect 100 may have an architecture that includes three layers, i.e., an upper protocol layer, a middle network layer, and a lower link layer. The protocol layer generates and processes requests and responses at the protocol nodes, defines the permitted cache state transitions at the protocol nodes that include caches, defines the transaction flows for each request type, and manages the protocol level flow control. The network layer packetizes the protocol message, determines, and adds to the packet, the source and target node IDs required to route the packet over interconnect 100 to the required destination. The link layer provides flow control between components, and manages link channels to provide deadlock free switching across interconnect 100.

Processor 110 is a general-purpose, central processing unit (CPU) that executes instructions to perform various functions for SoC 10, such as, for example, control, computation, input/output, etc. More particularly, processor 110 may include a single processor core or multiple processor cores, which may be arranged in a processor cluster, such as, for example the Arm Cortex A, R and M families of processors. Generally, processor 110 may execute computer programs or modules, such as an operating system, application software, other software modules, etc., stored within a memory, such as, for example, memory 142-1, memory 142-2, etc. Processor 110 may also include local cache memory.

Accelerator or special processor 120 is a specialized processor that is optimized to perform a specific function, such as process graphics, images and/or multimedia data, process digital signal data, process artificial neural network data, etc. For example, accelerator or special processor 120 may be a graphics processing unit (GPU), a neural processing unit (NPU), a digital signal processor (DSP), etc. More particularly, accelerator or special processor 120 may include a single processor core or multiple processor cores, such as, for example the Arm Mali family of GPUs, display processors and video processors, the Arm Machine Learning processor, etc. Accelerator or special processor 120 may also include local cache memory.

SMMU 130 includes a microprocessor, microcontroller, application specific integrated circuit (ASIC), field programmable gate array (FPGA), etc., and is configured to transmit data to and from various devices, such as, for example, PCIe devices, serial advanced technology attachment (SATA) devices, etc. Generally, SMMU 130 translates an input address into an output address by performing one or more translation table walks.

In certain embodiments, SMMU 130 is a memory management unit (MMU), such as, for example, the Arm CoreLink MMU family, that includes a translation buffer unit (TBU) and a translation cache unit (TCU), and communicates with various devices using AMBA connections with advanced extensible interface (AXI) and/or AXI Coherency Extensions (ACE) Lite protocols. SMMU 130 implements a master interface (i.e., a TBU) for each connected master device (e.g., TBU 0 for the master interface of PCIe device 152-1, TBU 1 for the master interface of PCIe device 152-2, etc.), and each TBU contains a Translation Look-aside Buffer (TLB) that caches page tables. The TCU controls and manages the address translations. TBU 0 and TBU 1 are independently connected to interconnect 100, and communicate with interconnect 100 using AMBA connections with AXI and/or ACE Lite protocols.

Memory controllers 140-1, 140-2 include a microprocessor, microcontroller, ASIC, FPGA, etc., and are configured to provide access to memories 142-1, 142-2 through interconnect 100. Memories 142-1, 142-2 may include a variety of non-transitory computer-readable medium that may be accessed by the other components of SoC 10, such as processor 110, accelerator or special processor 120, SMMU 130, etc. For example, memory 142-1 may store data and instructions for execution by processor 110, accelerator or special processor 120, etc.

In various embodiments, memories 142-1, 142-2 may include volatile and nonvolatile medium, non-removable medium and/or removable medium. For example, memories 142-1, 142-2 may include any combination of random access memory (RAM), dynamic RAM (DRAM), double data rate (DDR) DRAM or synchronous DRAM (SDRAM), static RAM (SRAM), read only memory (ROM), flash memory, cache memory, and/or any other type of non-transitory computer-readable medium. In certain embodiments, memory controllers 140-1, 140-2 are dynamic memory controllers that provide data transfers to and from high-density DDR3 or DDR4 DRAM memory, such as, for example, the Arm CoreLink Dynamic Memory Controller (DMC) family, each of which includes a fast, single-port CHI channel interface for connecting to interconnect 100.

NIC 150 includes a microprocessor, microcontroller, ASIC, FPGA, etc., and is configured to connect various devices, such as, for example, PCIe devices 152-1, 152-2, etc., using AMBA connections with AXI and/or ACE Lite protocols In certain embodiments, NIC 150 is a network interconnect, such as, for example, the Arm CoreLink NIC family, that includes AMBA interfaces with AXI and/or ACE Lite protocols. NIC 150 is coupled to interconnect 100 using, for example, one or more AMBA connections with AXI and/or ACE Lite protocols.

PCIe device 152-1 includes a PCIe root complex coupled to PCIe endpoint A. Similarly, PCIe device 152-2 includes a PCIe root complex coupled to PCIe endpoint B. In this embodiment, each root complex includes an AXI master interface that communicates with SMMU 130, and an AXI slave interface that communicates with NIC 150. The AXI master interface for PCIe device 152-1 is coupled to TBU 0 of SMMU 130, while the AXI master interface for PCIe device 152-2 is coupled to TBU 1 of SMMU 130.

Generally, PCIe endpoint A on PCIe device 152-1 and PCIe endpoint B on PCIe device 152-2 exchange PCIe peer-to-peer traffic through SMMU 130, interconnect 100, and NIC 150.

Figure 1B:
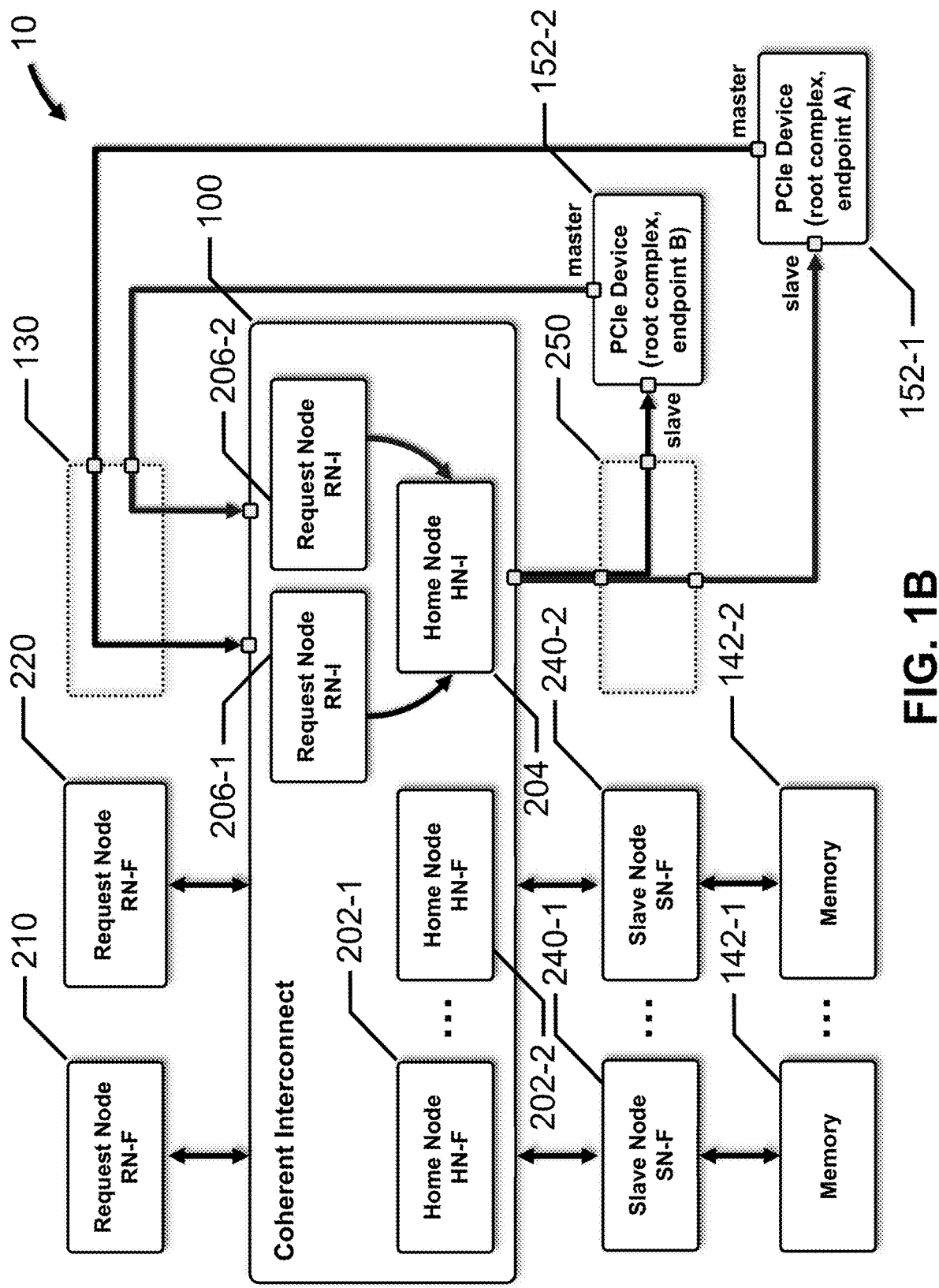
FIG. 1B depicts a block diagram for the SoC depicted in FIG. 1A using protocol node nomenclature, in accordance with an embodiment of the present disclosure.

FIG. 1B depicts a block diagram for SoC 10 using protocol node nomenclature, in accordance with an embodiment of the present disclosure.

A requester is represented by a Request Node (RN), which is a protocol node that generates protocol transactions for interconnect 100, such as, for example, memory reads and writes, I/O data transfers, etc. An RN-F protocol node represents a "fully" coherent requester, and an RN-I protocol node represents an "I/O" coherent requester. Processor 110 and accelerator or special processor 120 are fully coherent requesters, so RN-F 210 represents processor 110, and RN-F 220 represents accelerator or special processor 120. Each RN-I represents a master device that is connected to SMMU 130, and includes a microprocessor, microcontroller, ASIC, FPGA, logic circuits, etc., to provide the relevant functionality. In some embodiments, RN-Is may use the same hardware. PCIe devices 152-1, 152-2 are I/O coherent requesters, so RN-I 206-1 represents PCIe device 152-1, and RN-I 206-2 represents PCIe device 152-2. In this embodiment, SMMU 130 acts as a bridge from RN-Is 206-1, 206-2 to the master interfaces of PCIe devices 152-1, 152-2, respectively.

In this embodiment, interconnect 100 includes several completers, each including a microprocessor, microcontroller, ASIC, FPGA, logic circuits, etc., to provide the relevant functionality. Each completer is represented by a Home Node (HN), which is a protocol node that receives protocol transactions from RNs, and may receive protocol transactions from Slave Nodes (SNs), as described below. Each HN is responsible for managing a specific portion of the overall address space for SoC 10. Similar to RNs, an HN-F protocol node represents a fully coherent completer, and an HN-I protocol node represents an I/O coherent completer.

In many embodiments, the entire address space of memories 142-1, 142-2 may be managed by the HN-Fs 202-1, 202-2 in SoC 10. Each HN-F may include a system level cache and a snoop traffic filter, and acts as the Point-of-Coherency (PoC) and Point of Serialization (PoS) for the memory requests sent to that HN-F. To avoid conflicts when multiple RNs attempt to access the same memory address within memories 142-1, 142-2, HN-Fs 202-1, 202-2 act as the PoS, processing read requests, write requests, etc., in a serial manner. A fully coherent slave device may be represented by an SN-F node, which is a protocol node that receives and completes requests from the HN-Fs. Memory controllers 140-1, 140-2 are fully coherent slave devices, and are represented as SN-Fs 240-1, 240-2. HN-Fs 202-1, 202-2 are each associated with a respective SN-Fs 240-1, 240-2.

Each HN-I is responsible for managing all of the transactions targeting the address space of a particular memory-mapped I/O slave device or subsystem, and acts as the Point-of-Coherency (PoC) and Point of Serialization (PoS) for the requests sent to that slave device. PCIe devices 152-1, 152-2 are also memory-mapped I/O slave devices, so HN-I 204 manages the address spaces for PCIe devices 152-1, 152-1 (slave interfaces). In this embodiment, NIC 150 acts as a bridge to the slave interfaces of PCIe devices 152-1, 152-2.

PCIe peer-to-peer traffic, originating at PCIe endpoint A on PCIe device 152-1 and traveling to PCIe endpoint B on PCIe device 152-2, enters through RN-I 206-1, passes through interconnect 100, and exits through HN-I 204. Similarly, PCIe peer-to-peer traffic, originating at PCIe endpoint B on PCIe device 152-2 and traveling to PCIe endpoint A on PCIe device 152-1, enters through RN-I 206-2, passes through interconnect 100, and exits through HN-I 204. Posted write transactions follow Ordered Write Observation (OWO) to maintain PCIe ordering rules.

As discussed above, FIGS. 2A, 2B and 2C depict different topologies for interconnect 100, in accordance with embodiments of the present disclosure.

Figure 2A:
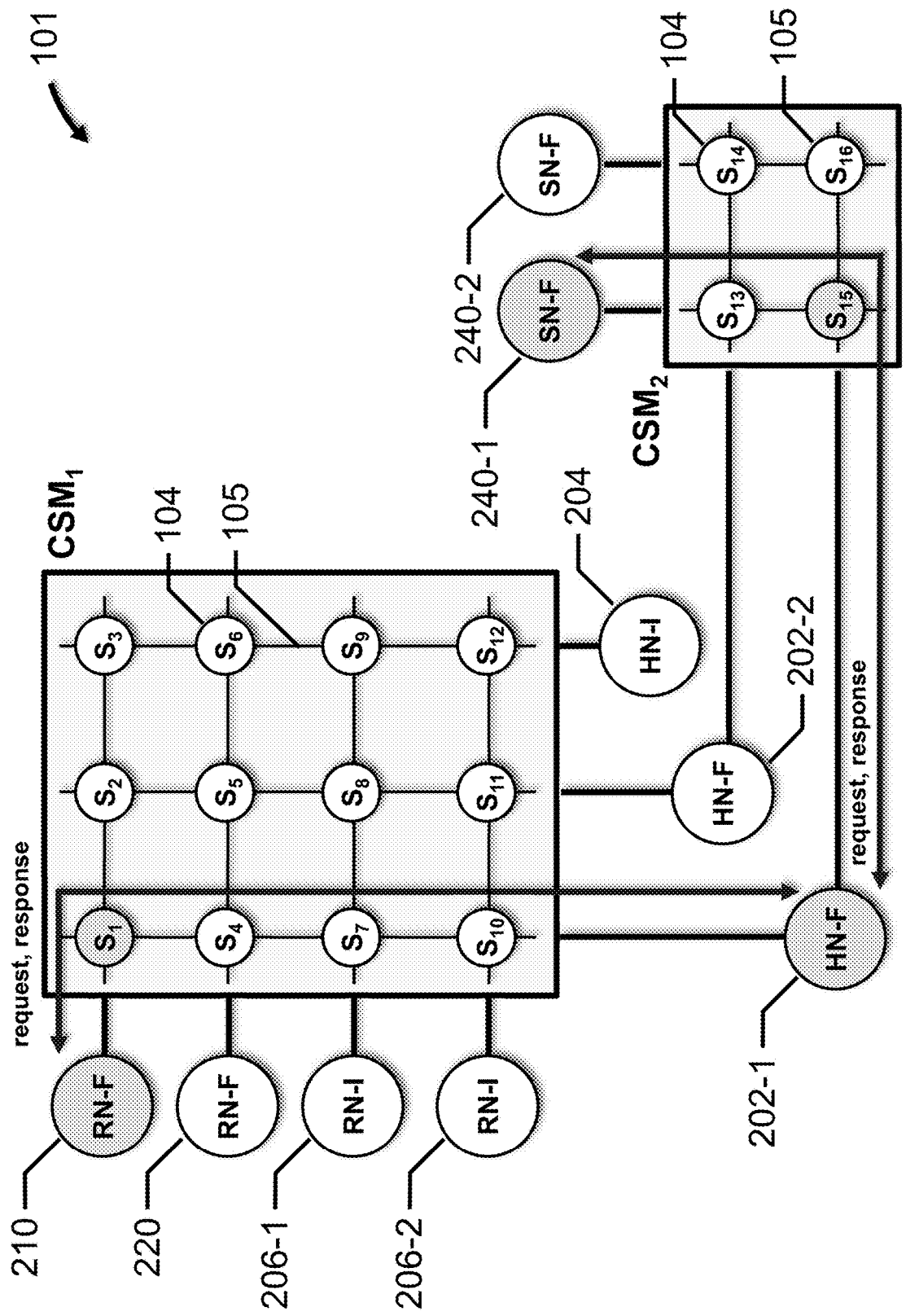
FIGS. 2A, 2B and 2C depict different topologies for an interconnect, in accordance with embodiments of the present disclosure.

FIG. 2A depicts interconnect 101 which has a crossbar topology that is configured to directly connect a pair of protocol nodes to exchange requests and responses. Interconnect 101 includes two crossbar switch matrices, $CSM_1$ and $CSM_2$. $CSM_1$ connects RN-F 210, RN-F 220, RN-I 206-1 and RN-I 206-2 to HN-F 202-1, HN-F 202-2 and HN-I 204. $CSM_2$ connects HN-F 202-1 and HN-F 202-2 to SN-F 240-1 and SN-F 240-2. $CSM_1$ includes 12 switches 104, $S_1$ to $S_{12}$, and connections 105 between adjacent switches 104. $CSM_2$ includes four switches 104, $S_{13}$ to $S_{16}$, and connections 105 between adjacent switches 104. Each connection 105 includes a sufficient number of wires to support the channels over which the requests and responses are conveyed. RN-F 210, RN-F 220, RN-I 206-1, RN-I 206-2, HN-F 202-1, HN-F 202-2 and HN-I 204 are directly connected to $CSM_1$. HN-F 202-1, HN-F 202-2, SN-F 240-1 and SN-F 240-2 are directly connected to $CSM_1$. As depicted in FIG. 2A, HN-F 202-1 and HN-F 202-2 are directly connected to both $CSM_1$ and $CSM_2$.

For example, to exchange requests and responses between RN-F 210 and HN-F 202-1, switch $S_1$ is closed, and to exchange requests and responses between HN-F 202-1 and SN-F 240-1, switch $S_{15}$ is closed. Only a single path between a pair of protocol nodes is configured at one time in each CSM. The relevant elements and paths are highlighted in FIG. 2A.

Figure 2B:
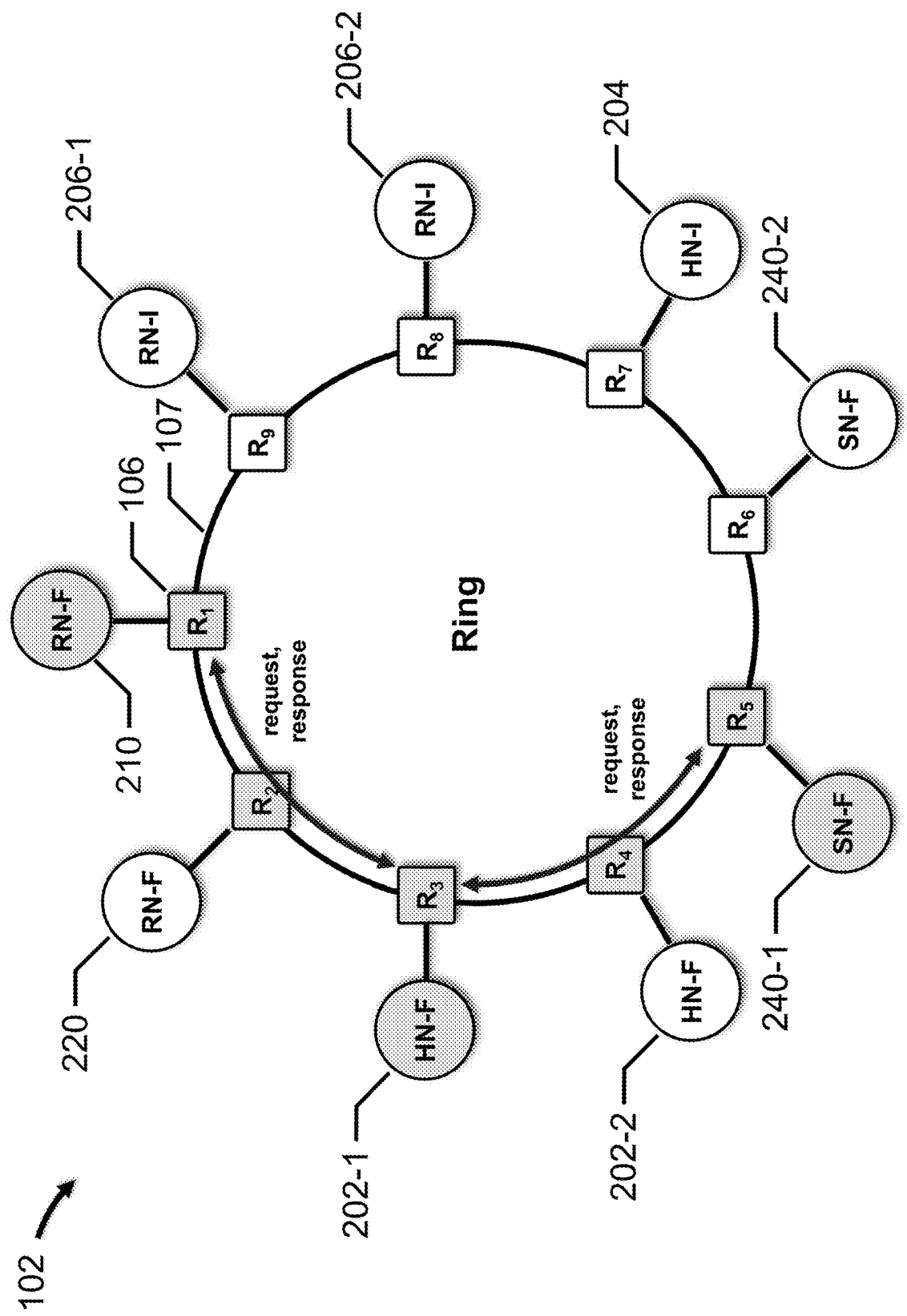

FIG. 2B depicts interconnect 102 which has a ring topology that is configured to connect all of the protocol nodes. The ring has nine routers 106, $R_1$ to $R_9$, and connections 107 between adjacent routers 106. Each connection 107 includes a sufficient number of wires to support the channels over which the requests and responses are conveyed. RN-F 210 is connected to router $R_1$, RN-F 220 is connected to router $R_2$, HN-F 202-1 is connected to router $R_3$, HN-F 202-2 is connected to router $R_4$, SN-F 240-1 is connected to router $R_5$, SN-F 240-2 is connected to router $R_6$, HN-I 204 is connected to router $R_7$, RN-I 206-2 is connected to router $R_8$, and RN-I 206-1 is connected to router $R_9$.

For example, to exchange requests and responses between RN-F 210 and HN-F 202-1, the messages are passed through routers $R_1$, $R_2$, and $R_3$, and to exchange requests and responses between HN-F 202-1 and SN-F 240-1, the messages are passed between routers $R_3$, $R_4$, and $R_5$. In the ring topology, multiple requests and responses may be flowing around the ring network at one time. The relevant elements and paths are highlighted in FIG. 2B.

Figure 2C:
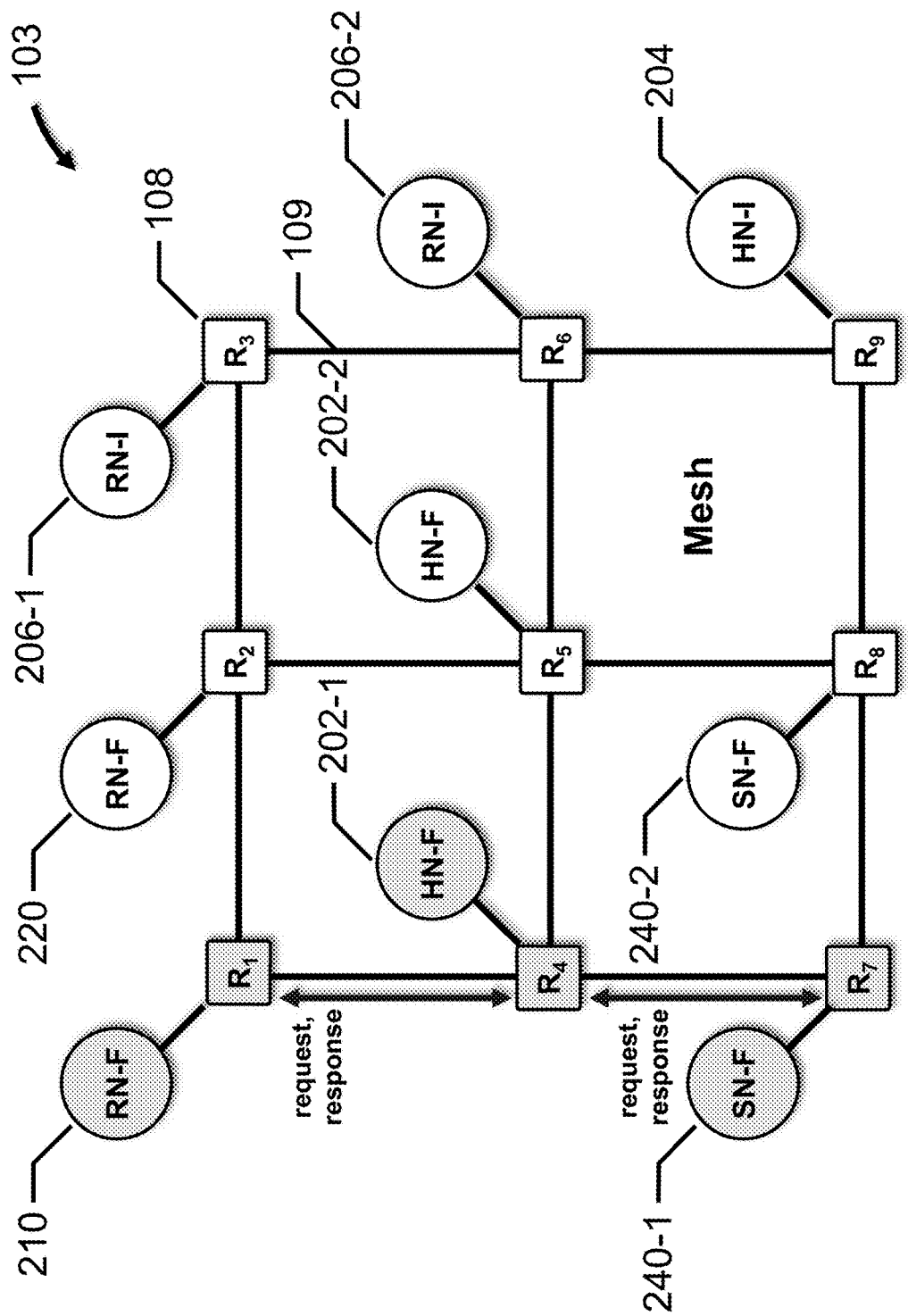

FIG. 2C depicts interconnect 102 which has a mesh topology that is configured to connect all of the protocol nodes. The mesh has nine routers 108, $R_1$ to $R_9$, and connections 109 between adjacent routers 108. Each connection 109 includes a sufficient number of wires to support the channels over which the requests and responses are conveyed. RN-F 210 is connected to router $R_1$, RN-F 220 is connected to router $R_2$, RN-I 206-1 is connected to router $R_3$, HN-F 202-1 is connected to router $R_4$, HN-F 202-2 is connected to router $R_5$, RN-I 206-2 is connected to router $R_6$, SN-F 240-1 is connected to router $R_7$, SN-F 240-2 is connected to router $R_8$, and HN-I 204 is connected to router $R_9$.

For example, to exchange requests and responses between RN-F 210 and HN-F 202-1, the messages are passed through routers $R_1$ and $R_4$, and to exchange requests and responses between HN-F 202-1 and SN-F 240-1, the messages are passed between routers $R_4$ and $R_7$. In the mesh topology, multiple requests and responses may be flowing through the mesh network at one time. The relevant elements and paths are highlighted in FIG. 2C.

Figure 3A:
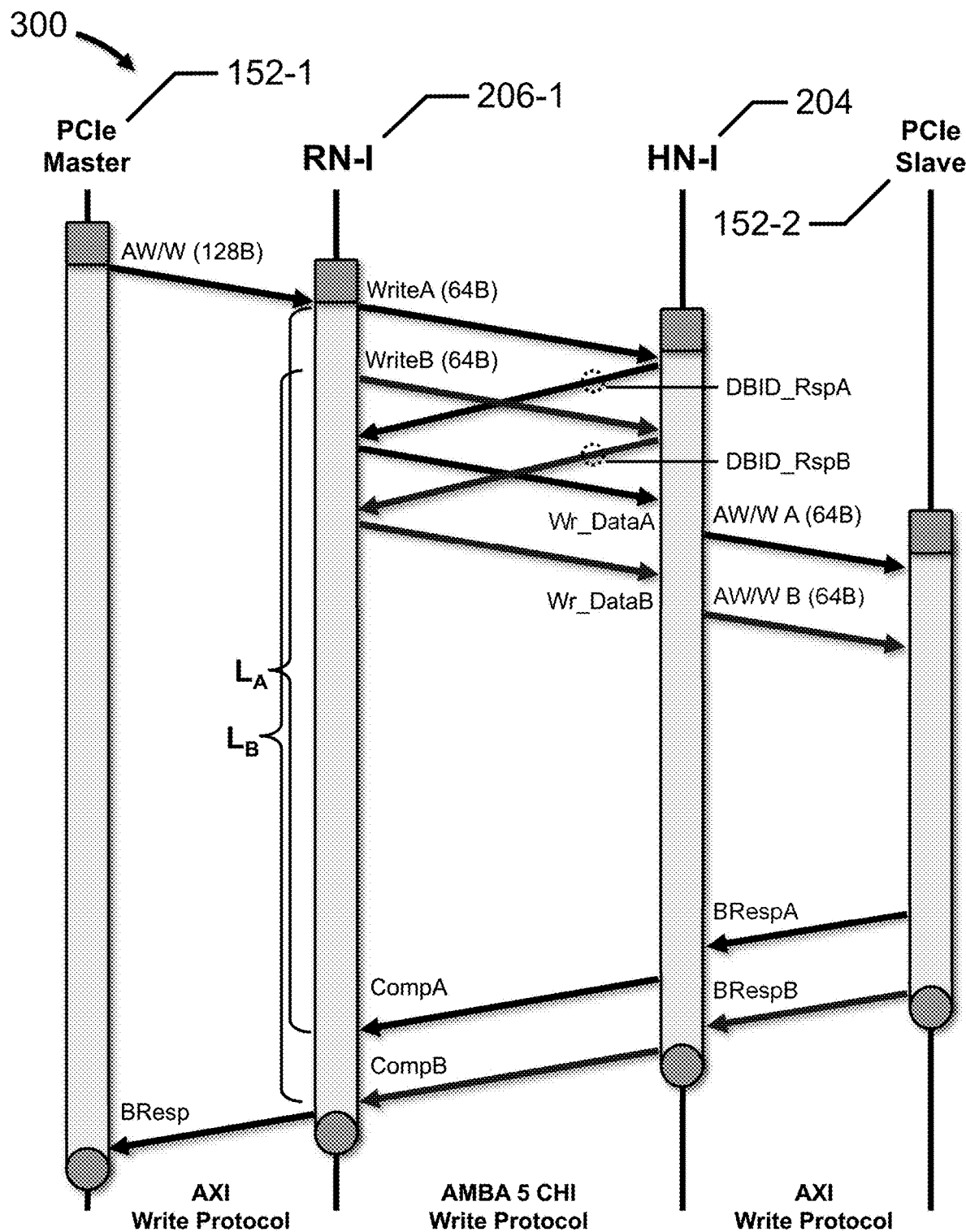
FIGS. 3A and 3B depict protocol flows for ordered write streams for the SoC depicted in FIGS. 1A and 1B.

FIG. 3A depicts a protocol flow 300 for an ordered write stream for the SoC 10 depicted in FIGS. 1A and 1B.

Protocol flow 300 illustrates an ordered write stream for PCIe peer-to-peer traffic flowing between PCIe endpoint A on PCIe device 152-1 and PCIe endpoint B on PCIe device 152-2. The PCIe peer-to-peer traffic flows between PCIe device 152-1 (master interface) and RN-I 206-1 through an AXI connection, between RN-I 206-1 and HN-I 204 through a CHI connection, and between HN-I 204 and PCIe device 152-2 (slave interface) through an AXI connection. The protocol nodes are positioned along the horizontal axis, and time is indicated vertically, from top to bottom. The lifetime of the write transaction at each protocol node is shown by an elongated shaded rectangle along the time axis, which begins with a square and ends with a circle. Other connection protocols are also contemplated.

PCIe device 152-1 (master interface) sends the address to be written and the data to be written to RN-I 206-1 over the AXI write address channel (AW) and write data channel (W), respectively. Because the size of the data to be written is 128 bytes (128B), RN-I 206-1 cracks or divides this write request into two separate, 64 byte (64B) write transactions for transmission over the AMBA CHI connection, i.e., a WriteA request message and a WriteB request message.

RN-I 206-1 sends the WriteA and WriteB request messages to HN-I 204 in order over the request channel of interconnect 100, which include the addresses to be written. In response to receiving the WriteA and WriteB request messages, HN-I 204 sends DBID_RspA and DBID_RspB response messages to RN-I 206-1 in order over the response channel of interconnect 100, which provides the data buffer identifiers for each write transaction. In response to receiving the DBID_RspA response message, RN-I 206-1 sends a Wr_DataA data message to HN-I 204 over the data channel of interconnect 100, which includes the first 64B of data to be written. Similarly, in response to receiving the DBID_RspB response message, RN-I 206-1 sends a Wr_DataB data message to HN-I 204 over the data channel of interconnect 100, which includes the second 64B of data to be written.

In response to receiving the Wr_DataA data message, HN-I 204 sends the address to be written and the first 64B of data to be written to PCIe device 152-2 (slave interface) over the AXI write address channel (AW) and write data channel (W), respectively. Similarly, in response to receiving the Wr_DataB data message, HN-I 204 sends the address to be written and the second 64B of data to be written to PCIe device 152-2 (slave interface) over the AXI write address channel (AW) and write data channel (W), respectively.

After the first 64B write transaction has been completed, PCIe device 152-2 (slave interface) sends a BRespA write response to HN-I 204, over the write response channel, indicating the status of the first write transaction. Similarly, after the second 64B write transaction has been completed, PCIe device 152-2 (slave interface) sends a BRespB write response to HN-I 204, over the write response channel, indicating the status of the second write transaction.

In response to receiving the BRespA write response, HN-I 204 sends a CompA write completion response message to RN-I 206-1 over the response channel. HN-I 204 must wait for the BRespA write response to arrive from PCIe device 152-2 before sending the CompA write completion response message because PCIe device 152-2 is the PoS in this embodiment. Similarly, in response to receiving the BRespB write response, HN-I 204 sends a CompB write completion response message to RN-I 206-1 over the response channel. HN-I 204 must wait for the BRespB write response to arrive from PCIe device 152-2 before sending the CompB write completion response message because PCIe device 152-2 is the PoS in this embodiment.

Finally, in response to receiving the CompB write completion response message, RN-I 206-1 sends a BResp write completion response message to PCIe device 152-1 (master interface) over the response channel. The lifetime, $L_A$, of the WriteA write transaction and the lifetime, $L_B$, of the WriteB write transaction are depicted in FIG. 3A.

Figure 3B:
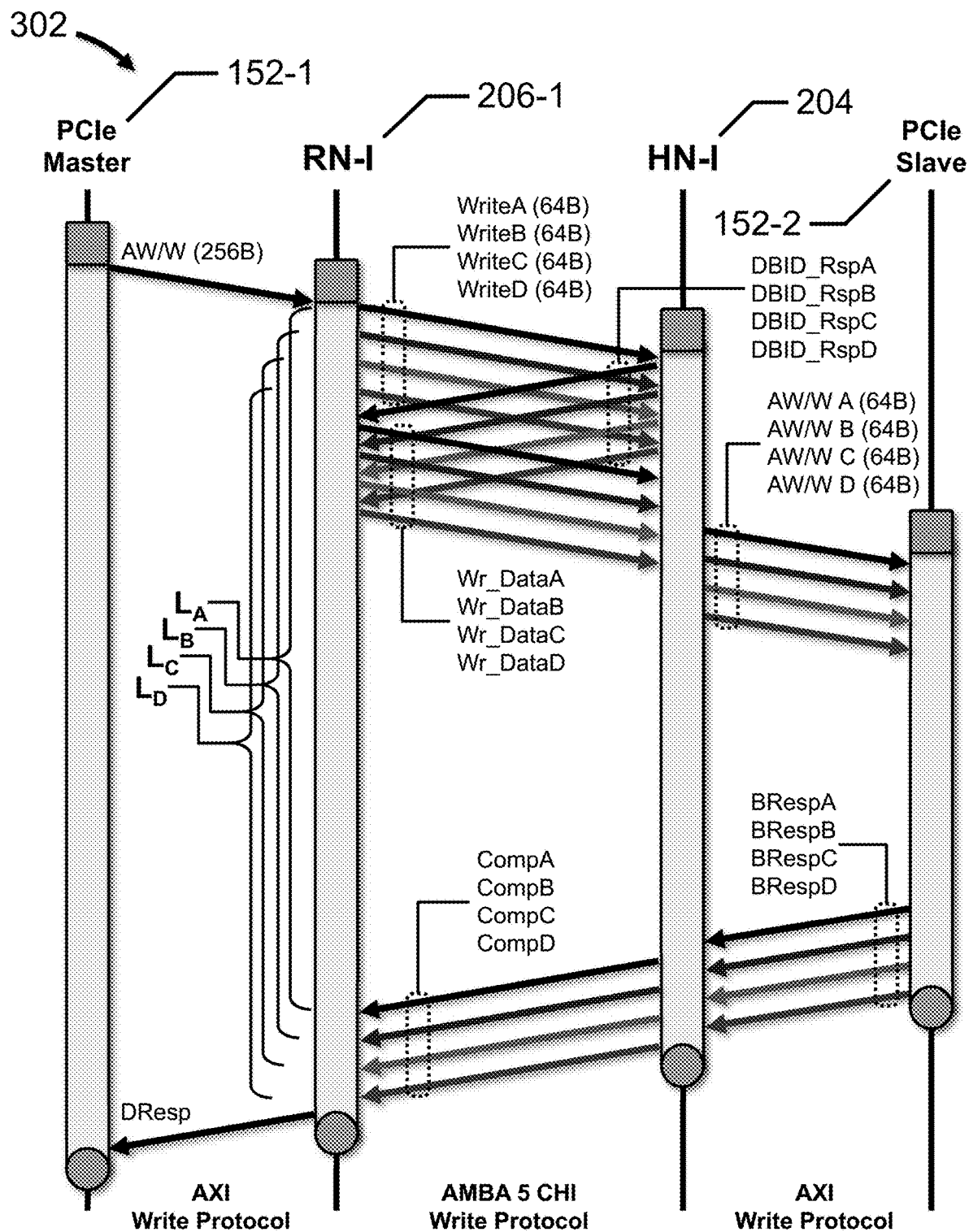

FIG. 3B depicts a protocol flow 302 for another ordered write stream for the SoC depicted in FIGS. 1A and 1B.

Protocol flow 302 illustrates an ordered write stream for PCIe peer-to-peer traffic flowing between PCIe endpoint A on PCIe device 152-1 and PCIe endpoint B on PCIe device 152-2. The PCIe peer-to-peer traffic flows between PCIe device 152-1 (master interface) and RN-I 206-1 through an AXI connection, between RN-I 206-1 and HN-I 204 through a CHI connection, and between HN-I 204 and PCIe device 152-2 (slave interface) through an AXI connection.

PCIe device 152-1 (master interface) sends the address to be written and the data to be written to RN-I 206-1 over the AXI write address channel (AW) and write data channel (W), respectively. Because the size of the data to be written is 256 bytes (256B), RN-I 206-1 cracks or divides this write request into four separate, 64B write transactions for transmission over the AMBA CHI connection, i.e., WriteA, WriteB, WriteC and WriteD request messages.

RN-I 206-1 sends the WriteA, WriteB, WriteC and WriteD request messages to HN-I 204 in order over the request channel of interconnect 100, which include the addresses to be written. In response to receiving the WriteA, WriteB, WriteC and WriteD request messages, HN-I 204 sends DBID_RspA, DBID_RspB, DBID_RspC, and DBID_RspD response messages to RN-I 206-1 in order over the response channel of interconnect 100, which provides the data buffer identifiers for each write transaction. In response to receiving the DBID_RspA response message, RN-I 206-1 sends a Wr_DataA data message to HN-I 204 over the data channel of interconnect 100, which includes the first 64B of data to be written. Similarly, in response to receiving the DBID_RspB response message, RN-I 206-1 sends a Wr_DataB data message to HN-I 204 over the data channel of interconnect 100, which includes the second 64B of data to be written. In response to receiving the DBID_RspC response message, RN-I 206-1 sends a Wr_DataC data message to HN-I 204 over the data channel of interconnect 100, which includes the third 64B of data to be written. And, in response to receiving the DBID_RspD response message, RN-I 206-1 sends a Wr_DataD data message to HN-I 204 over the data channel of interconnect 100, which includes the fourth 64B of data to be written.

In response to receiving the Wr_DataA data message, HN-I 204 sends the address to be written and the first 64B of data to be written to PCIe device 152-2 (slave interface) over the AXI write address channel (AW) and write data channel (W), respectively. Similarly, in response to receiving the Wr_DataB data message, HN-I 204 sends the address to be written and the second 64B of data to be written to PCIe device 152-2 (slave interface) over the AXI write address channel (AW) and write data channel (W), respectively. In response to receiving the Wr_DataC data message, HN-I 204 sends the address to be written and the third 64B of data to be written to PCIe device 152-2 (slave interface) over the AXI write address channel (AW) and write data channel (W), respectively. And, in response to receiving the Wr_DataD data message, HN-I 204 sends the address to be written and the fourth 64B of data to be written to PCIe device 152-2 (slave interface) over the AXI write address channel (AW) and write data channel (W), respectively.

After the first 64B write transaction has been completed, PCIe device 152-2 (slave interface) sends a BRespA write response to HN-I 204, over the write response channel, indicating the status of the first write transaction. Similarly, after the second 64B write transaction has been completed, PCIe device 152-2 (slave interface) sends a BRespB write response to HN-I 204, over the write response channel, indicating the status of the second write transaction. After the third 64B write transaction has been completed, PCIe device 152-2 (slave interface) sends a BRespC write response to HN-I 204, over the write response channel, indicating the status of the third write transaction. And, after the fourth 64B write transaction has been completed, PCIe device 152-2 (slave interface) sends a BRespD write response to HN-I 204, over the write response channel, indicating the status of the fourth write transaction.

In response to receiving the BRespA write response, HN-I 204 sends a CompA write completion response message to RN-I 206-1 over the response channel. HN-I 204 must wait for the BRespA write response to arrive from PCIe device 152-2 before sending the CompA write completion response message because PCIe device 152-2 is the PoS in this embodiment. Similarly, in response to receiving the BRespB write response, HN-I 204 sends a CompB write completion response message to RN-I 206-1 over the response channel. HN-I 204 must wait for the BRespB write response to arrive from PCIe device 152-2 before sending the CompB write completion response message because PCIe device 152-2 is the PoS in this embodiment. In response to receiving the BRespC write response, HN-I 204 sends a CompC write completion response message to RN-I 206-1 over the response channel. HN-I 204 must wait for the BRespC write response to arrive from PCIe device 152-2 before sending the CompC write completion response message because PCIe device 152-2 is the PoS in this embodiment. And, in response to receiving the BRespD write response, HN-I 204 sends a CompD write completion response message to RN-I 206-1 over the response channel. HN-I 204 must wait for the BRespD write response to arrive from PCIe device 152-2 before sending the CompD write completion response message because PCIe device 152-2 is the PoS in this embodiment.

Finally, in response to receiving the CompD write completion response message, RN-I 206-1 sends a BResp write completion response message to PCIe device 152-1 (master interface) over the response channel. The lifetimes, $L_A$, $L_B$, $L_C$ and $L_D$ of the WriteA, WriteB, WriteC and WriteD write transactions are depicted in FIG. 3B.

Figure 4A:
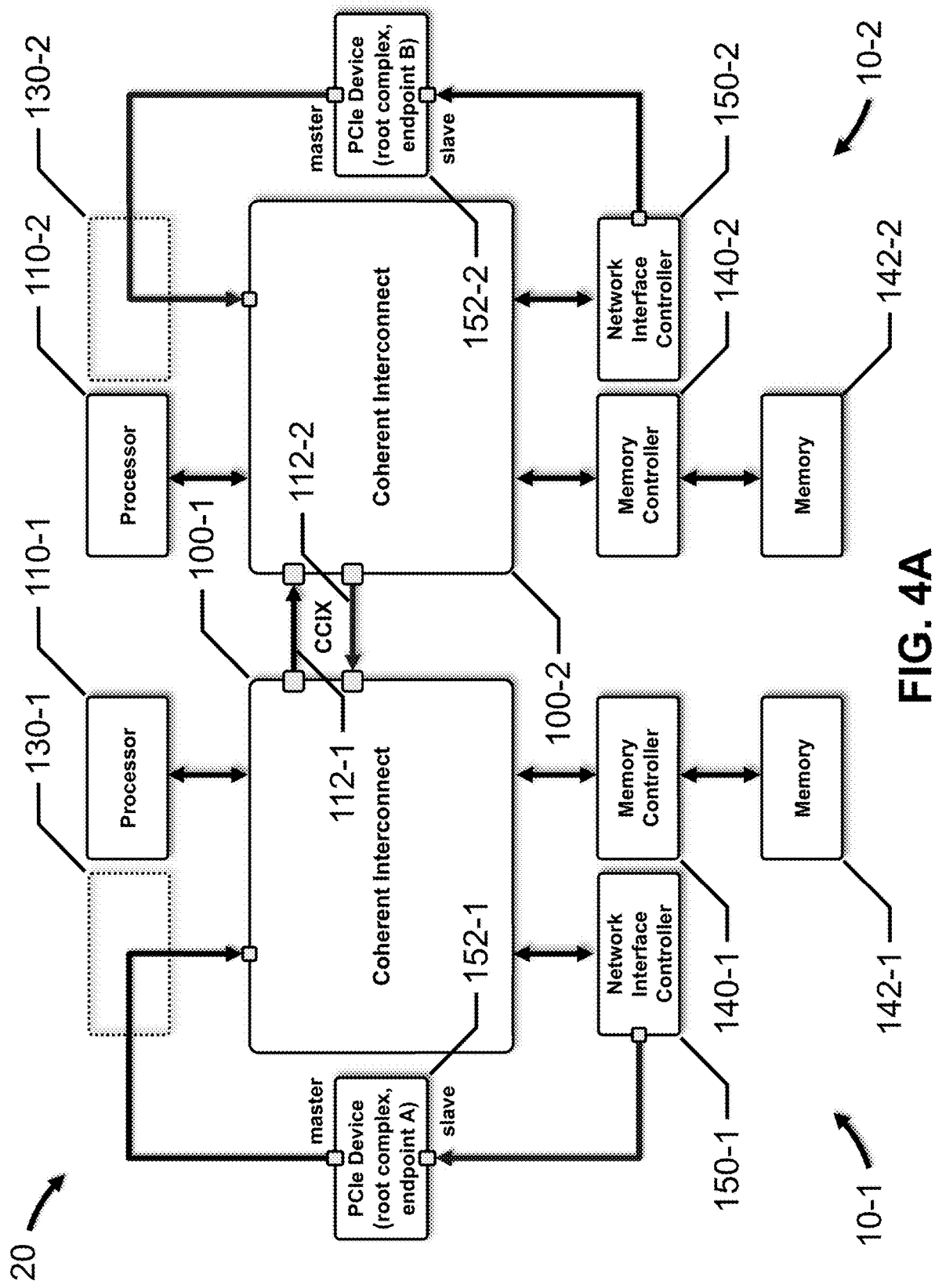
FIG. 4A depicts a block diagram for a system with two interconnected SoCs, in accordance with an embodiment of the present disclosure.

FIG. 4A depicts a block diagram for a system 20 with two interconnected SoCs, in accordance with an embodiment of the present disclosure.

SoC 10-1 and SoC 10-2 are depicted as including a baseline number of components; in other embodiments, SoC 10-1 and SoC 10-2 may include additional components, such as, for example, accelerator of special processor 120, etc. Additional SoCs 10 may be easily added to system 20, as discussed below.

In this embodiment, SoC 10-1 includes interconnect 100-1 coupled to one or more processors 110-1, memory controller 140-1, and NIC device 150-1. Memory controller 140-1 is coupled to memory 142-1, which may be integrated on SoC 10-1 or externally connected. PCIe device 152-1 (slave interface) is connected to NIC 150-1. In certain embodiments, SoC 10-1 may include SMMU 130-1 (depicted in phantom outline), which connects interconnect 100-1 to PCIe device 152-1 (master interface); in other embodiments, interconnect 100-1 may be directly connected to PCIe device 152-1 (master interface).

Similarly, SoC 10-2 includes interconnect 100-2 coupled to one or more processors 110-2, memory controller 140-2, and NIC device 150-2. Memory controller 140-2 is coupled to memory 142-2, which may be integrated on SoC 10-2 or externally connected. PCIe device 152-2 (slave interface) is connected to NIC 150-2. In certain embodiments, SoC 10-2 may include SMMU 130-2 (depicted in phantom outline), which connects interconnect 100-2 to PCIe device 152-2 (master interface); in other embodiments, interconnect 100-2 may be directly connected to PCIe device 152-2 (master interface).

Interconnect 100-1 may be connected to interconnect 100-2 using two or more Cache Coherent Interconnect for Accelerators (CCIX) connections 112-1, 112-2; other types of connections are also contemplated. CCIX is a chip-to-chip interconnect that enables two or more devices to share data in a cache coherent manner. In the embodiment depicted in FIG. 3A, two CCIX connections 112-1 and 112-2 are depicted, one connection for each traffic direction. In other embodiments, a single CCIX connection 112 may be shared by all of the traffic. Generally, one or more CCIX connections 112 form a CCIX interconnect. CCIX protocol advantageously integrates with the PCIe protocol as well as the AMBA CHI, AXI and/or ACE Lite protocols. Additional SoCs 10 may be added to system 20 simply by adding additional CCIX connections 112 according to a particular connection topology, such as, for example, direct, switched, daisy chained, meshed, etc.

Generally, PCIe endpoint A on PCIe device 152-1 and PCIe endpoint B on PCIe device 152-2 exchange PCIe peer-to-peer traffic through (optional) SMMUs 130-1, 130-2, interconnects 100-1, 100-2, CCIX connections 112-1, 112-2, and NICs 150-1, 150-2.

Figure 4B:
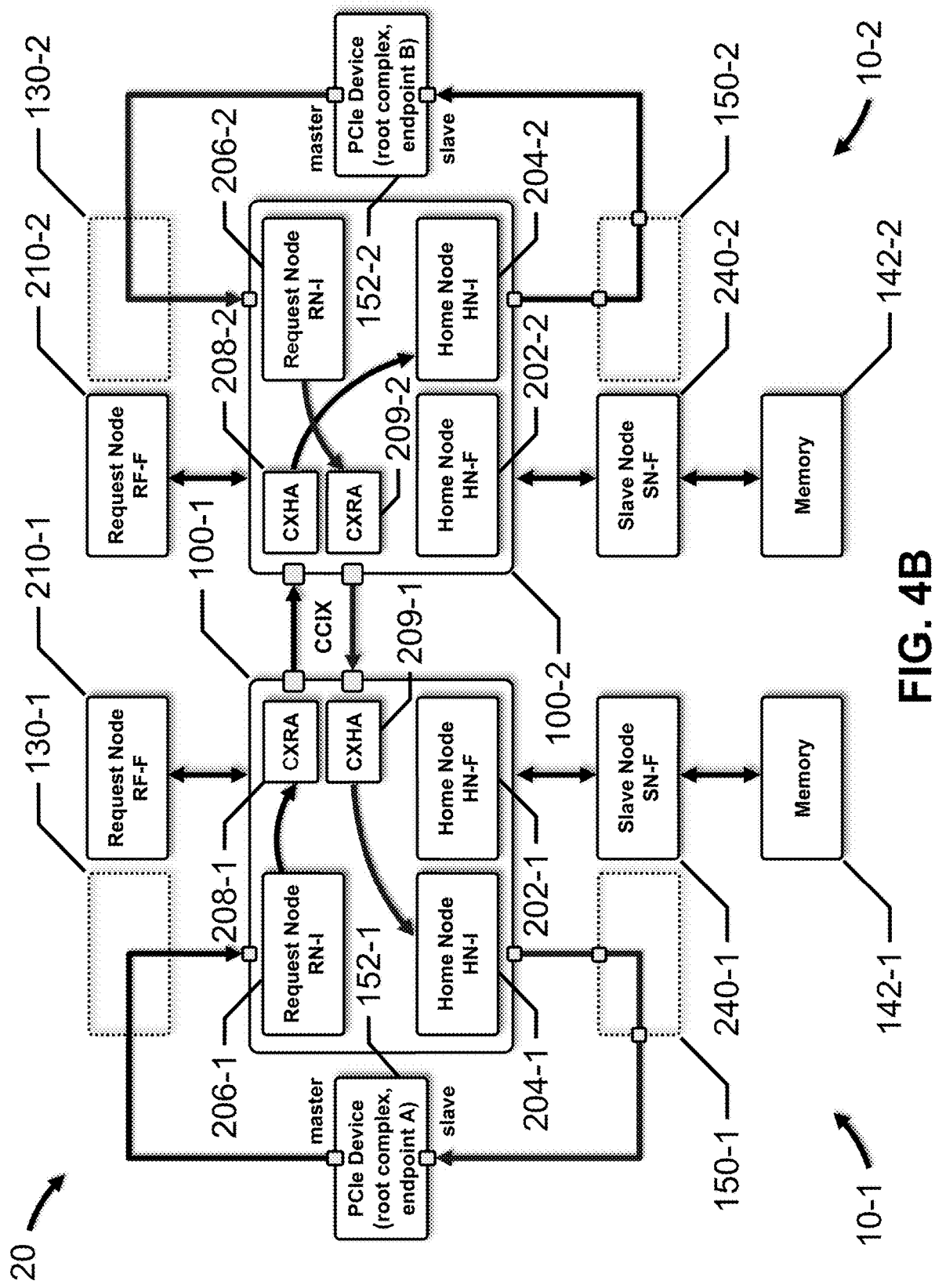
FIG. 4B depicts a block diagram for the system depicted in FIG. 4A using protocol node nomenclature, in accordance with an embodiment of the present disclosure.

FIG. 4B depicts a block diagram for the system 20 depicted in FIG. 3A using protocol node nomenclature, in accordance with an embodiment of the present disclosure.

SoC 10-1 and SoC 10-2 include a subset of the protocol nodes depicted in FIG. 3B and discussed above, as well as additional protocol nodes related to CCIX connections 112-1 and 112-2.

With respect to SoC 10-1, RN-F 210-1 represents processor 110-1, RN-I 206-1 represents PCIe device 152-1 (master interface), HN-F 202-1 manages the address space of memory 142-1 and is associated with SN-F 240-1 which represents memory controller 140-1, and HN-I 204 manages the address space for PCIe device 152-1 (slave interface). In this embodiment, NIC 150-1 acts as a bridge to the slave interface of PCIe device 152-1. If present, SMMU 130-1 may act as a bridge from RN-I 206-1 to the master interface of PCIe device 152-1.

CCIX request agent (CXRA) 208-1 performs read and write transactions over CCIX connection 112-1, and includes a microprocessor, microcontroller, ASIC, FPGA, logic circuits, etc., to provide the relevant functionality. CCIX home agent (CXHA) 209-1 is responsible for managing coherency for CCIX connection 112-2, and includes a microprocessor, microcontroller, ASIC, FPGA, logic circuits, etc., to provide the relevant functionality. In some embodiments, CXRA 208-1 and CXHA 209-1 may use the same hardware.

With respect to SoC 10-2, RN-F 210-2 represents processor 110, RN-I 206-2 represents PCIe device 152-2 (master interface), HN-F 202-2 manages the address space of memory 142-2 and is associated with SN-F 240-2 which represents memory controller 140-2, and HN-I 204 manages the address space for PCIe device 152-2 (slave interface). In this embodiment, NIC 150-2 acts as a bridge to the slave interface of PCIe device 152-2. If present, SMMU 130-2 may act as a bridge from RN-I 206-2 to the master interface of PCIe device 152-2.

CCIX request agent (CXRA) 208-2 performs read and write transactions over CCIX connection 112-2, and includes a microprocessor, microcontroller, ASIC, FPGA, logic circuits, etc., to provide the relevant functionality. CCIX home agent (CXHA) 209-2 is responsible for managing coherency for CCIX connection 112-1, and includes a microprocessor, microcontroller, ASIC, FPGA, logic circuits, etc., to provide the relevant functionality. In some embodiments, CXRA 208-2 and CXHA 209-2 may use the same hardware.

PCIe peer-to-peer traffic, originating at PCIe endpoint A on PCIe device 152-1 and traveling to PCIe endpoint B on PCIe device 152-2, enters through RN-I 206-1, passes through interconnect 100-1, CCIX connection 112-1 and interconnect 100-2, and exits through HN-I 204-2. Similarly, PCIe peer-to-peer traffic, originating at PCIe endpoint B on PCIe device 152-2 and traveling to PCIe endpoint A on PCIe device 152-1, enters through RN-I 206-2, passes through interconnect 100-2, CCIX connection 112-2 and interconnect 100-1, and exits through HN-I 204-1. Posted write transactions follow OWO in order to maintain PCIe ordering rules.

Figure 5A:
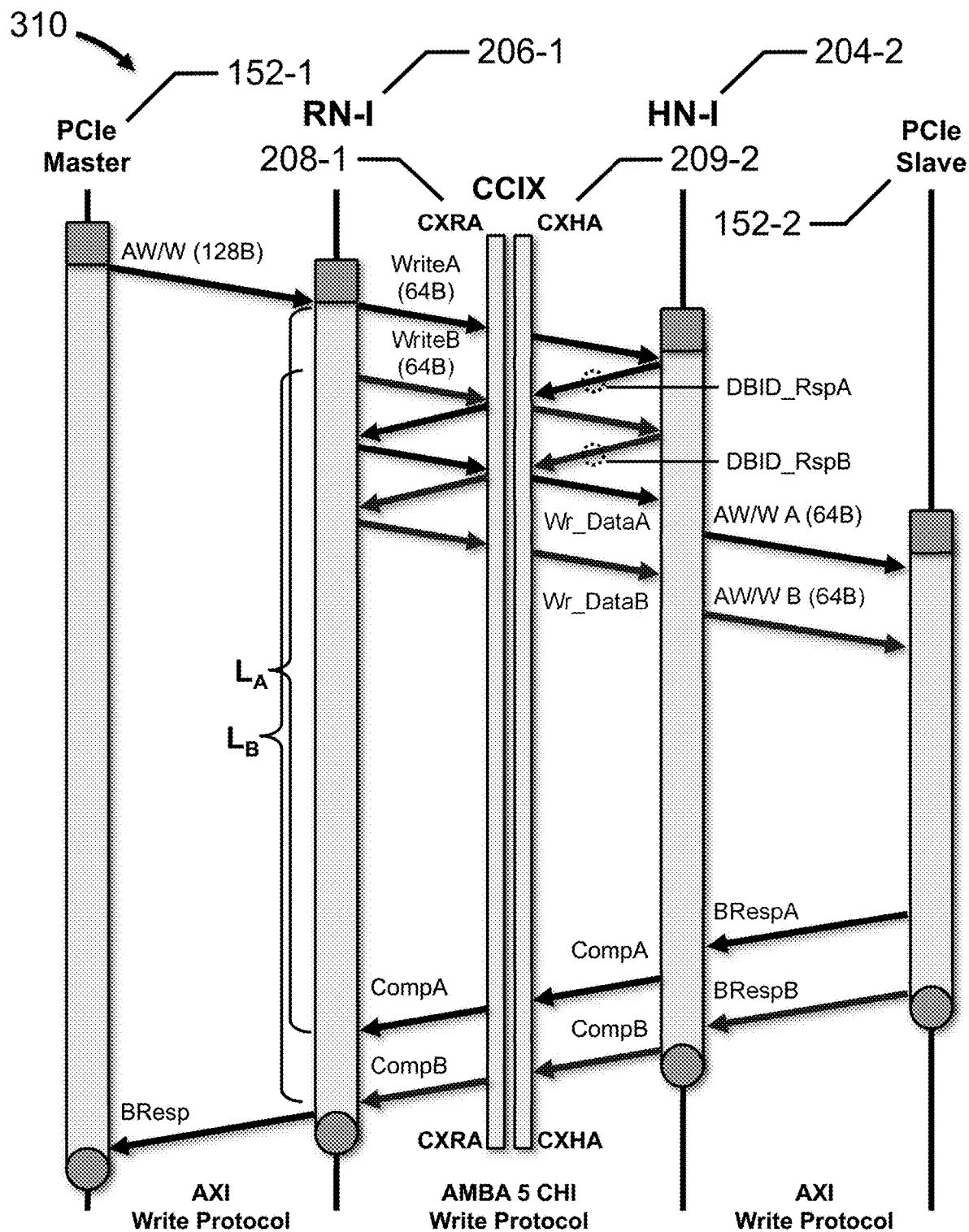
FIGS. 5A and 5B depict protocol flows for ordered write streams for the system 20 depicted in FIGS. 4A and 4B.

FIG. 5A depicts a protocol flow 310 for an ordered write stream for the system 20 depicted in FIGS. 4A and 4B.

Protocol flow 310 illustrates an ordered write stream for PCIe peer-to-peer traffic flowing between PCIe endpoint A on PCIe device 152-1 and PCIe endpoint B on PCIe device 152-2. The PCIe peer-to-peer traffic flows between PCIe device 152-1 (master interface) and RN-I 206-1 through an AXI connection, between RN-I 206-1 and CXRA 208-1 through a CHI connection on interconnect 100-1, between CXRA 208-1 and CXHA 290-2 through a CCIX connection, between CXHA 290-2 and HN-I 204-2 through a CHI connection on interconnect 100-2, and between HN-I 204-2 and PCIe device 152-2 (slave interface) through an AXI connection.

PCIe device 152-1 (master interface) sends the address to be written and the data to be written to RN-I 206-1 over the AXI write address channel (AW) and write data channel (W), respectively. Because the size of the data to be written is 128 bytes (128B), RN-I 206-1 cracks or divides this write request into two separate, 64 byte (64B) write transactions for transmission over the AMBA CHI connection, i.e., a WriteA request message and a WriteB request message.

RN-I 206-1 sends the WriteA and WriteB request messages to CXRA 208-1 in order over the request channel of interconnect 100-1, which include the addresses to be written. CXRA 208-1 forwards the WriteA and WriteB request messages to CXHA 209-2 in order over the CCIX connection, which then forwards the WriteA and WriteB request messages to HN-I 204-2 in order over the request channel of interconnect 100-2.

In response to receiving the WriteA and WriteB request messages, HN-I 204-2 sends DBID_RspA and DBID_RspB response messages to CXHA 209-2 in order over the response channel of interconnect 100-2, which provides the data buffer identifiers for each write transaction. CXHA 209-2 forwards the DBID_RspA and DBID_RspB response messages to CXRA 208-1 in order over the CCIX connection, which then forwards the DBID_RspA and DBID_RspB response messages to RN-I 206-1 in order over the response channel of interconnect 100-1.

In response to receiving the DBID_RspA response message, RN-I 206-1 sends a Wr_DataA data message to CXRA 208-1 over the data channel of interconnect 100-1, which includes the first 64B of data to be written. Similarly, in response to receiving the DBID_RspB response message, RN-I 206-1 sends a Wr_DataB data message to CXRA 208-1 over the data channel of interconnect 100-1, which includes the second 64B of data to be written. CXRA 208-1 forwards the Wr_DataA and Wr_DataB data messages to CXHA 209-2 in order over the CCIX connection, which then forwards the Wr_DataA and Wr_DataB data messages to HN-I 204-2 in order over the data channel of interconnect 100-2.

In response to receiving the Wr_DataA data message, HN-I 204-2 sends the address to be written and the first 64B of data to be written to PCIe device 152-2 (slave interface) over the AXI write address channel (AW) and write data channel (W), respectively. Similarly, in response to receiving the Wr_DataB data message, HN-I 204-2 sends the address to be written and the second 64B of data to be written to PCIe device 152-2 (slave interface) over the AXI write address channel (AW) and write data channel (W), respectively.

After the first 64B write transaction has been completed, PCIe device 152-2 (slave interface) sends a BRespA write response to HN-I 204-2, over the write response channel, indicating the status of the first write transaction. Similarly, after the second 64B write transaction has been completed, PCIe device 152-2 (slave interface) sends a BRespB write response to HN-I 204-2, over the write response channel, indicating the status of the second write transaction.

In response to receiving the BRespA write response, HN-I 204-2 sends a CompA write completion response message to CXHA 209-2 over the response channel of interconnect 100-2, which forwards the CompA write completion response message to CXRA 208-1 in order over the CCIX connection, which then forwards the CompA write completion response message to RN-I 206-1 in order over the response channel of interconnect 100-1. HN-I 204-2 must wait for the BRespA write response to arrive from PCIe device 152-2 before sending the CompA write completion response message because PCIe device 152-2 is the PoS in this embodiment.

Similarly, in response to receiving the BRespB write response, HN-I 204-2 sends a CompB write completion response message to CXHA 209-2 over the response channel of interconnect 100-2, which forwards the CompB write completion response message to CXRA 208-1 in order over the CCIX connection, which then forwards the CompB write completion response message to RN-I 206-1 in order over the response channel of interconnect 100-1. HN-I 204-2 must wait for the BRespB write response to arrive from PCIe device 152-2 before sending the CompB write completion response message because PCIe device 152-2 is the PoS in this embodiment.

Finally, in response to receiving the CompB write completion response message, RN-I 206-1 sends a BResp write completion response message to PCIe device 152-1 (master interface) over the response channel. The lifetime, $L_A$, of the WriteA write transaction and the lifetime, $L_B$, of the WriteB write transaction are depicted in FIG. 5A.

Figure 5B:
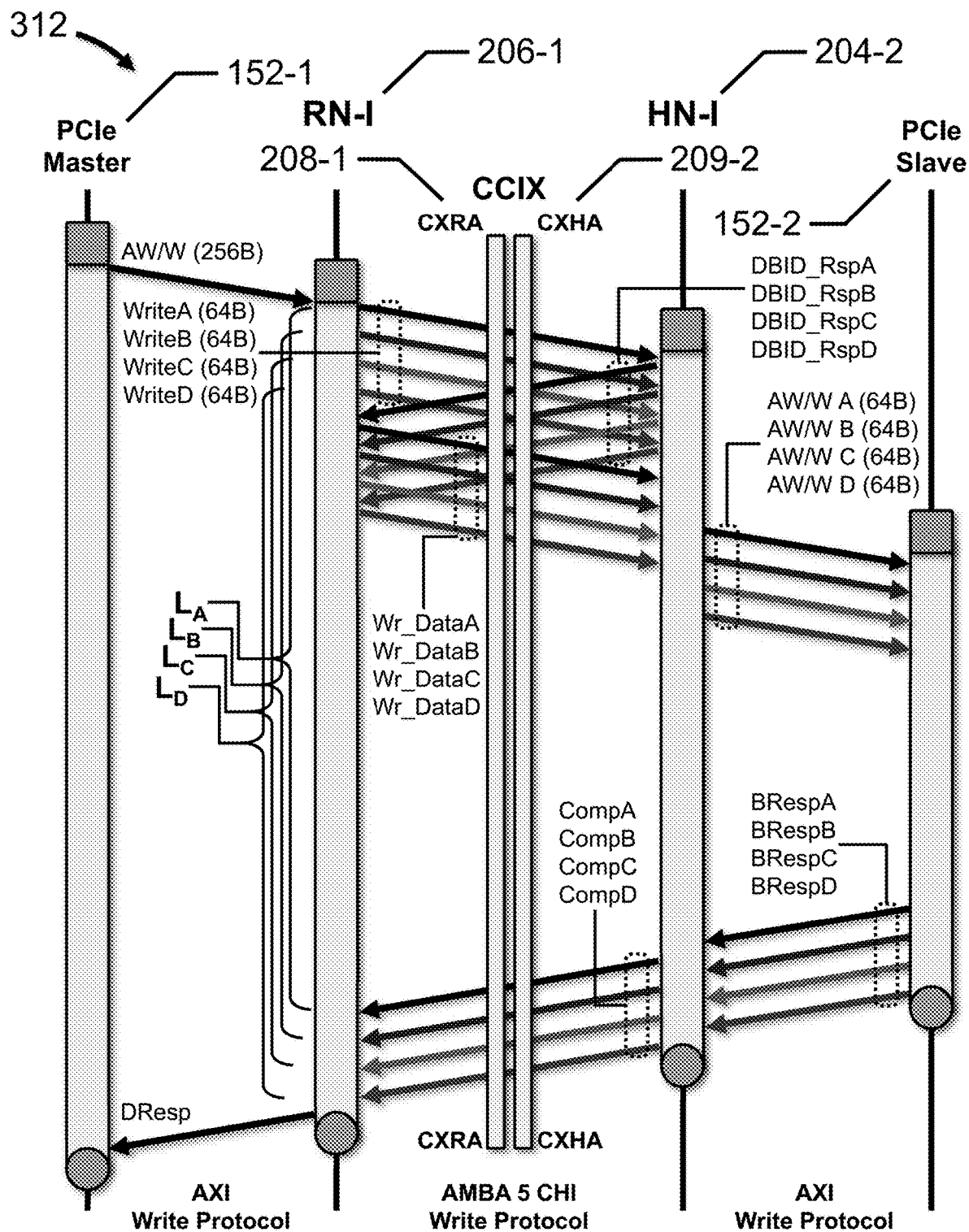

FIG. 5B depicts a protocol flow 312 for an ordered write stream for the system 20 depicted in FIGS. 4A and 4B.

Protocol flow 312 illustrates an ordered write stream for PCIe peer-to-peer traffic flowing between PCIe endpoint A on PCIe device 152-1 and PCIe endpoint B on PCIe device 152-2. The PCIe peer-to-peer traffic flows between PCIe device 152-1 (master interface) and RN-I 206-1 through an AXI connection, between RN-I 206-1 and CXRA 208-1 through a CHI connection on interconnect 100-1, between CXRA 208-1 and CXHA 290-2 through a CCIX connection, between CXHA 290-2 and HN-I 204-2 through a CHI connection on interconnect 100-2, and between HN-I 204-2 and PCIe device 152-2 (slave interface) through an AXI connection.

PCIe device 152-1 (master interface) sends the address to be written and the data to be written to RN-I 206-1 over the AXI write address channel (AW) and write data channel (W), respectively. Because the size of the data to be written is 256 bytes (256B), RN-I 206-1 cracks or divides this write request into four separate, 64B write transactions for transmission over the AMBA CHI connection, i.e., WriteA, WriteB, WriteC and WriteD request messages.

RN-I 206-1 sends the WriteA, WriteB, WriteC and WriteD request messages to CXRA 208-1 in order over the request channel of interconnect 100-1, which include the addresses to be written. CXRA 208-1 forwards the WriteA, WriteB, WriteC and WriteD request messages to CXHA 209-2 in order over the CCIX connection, which then forwards the WriteA, WriteB, WriteC and WriteD request messages to HN-I 204-2 in order over the request channel of interconnect 100-2.

In response to receiving the WriteA, WriteB, WriteC and WriteD request messages, HN-I 204-2 sends DBID_RspA, DBID_RspB, DBID_RspC, and DBID_RspD response messages to CXHA 209-2 in order over the response channel of interconnect 100-2, which provides the data buffer identifiers for each write transaction. CXHA 209-2 forwards the DBID_RspA, DBID_RspB, DBID_RspC, and DBID_RspD response messages to CXRA 208-1 in order over the CCIX connection, which then forwards the DBID_RspA, DBID_RspB, DBID_RspC, and DBID_RspD response messages to RN-I 206-1 in order over the response channel of interconnect 100-1.

In response to receiving the DBID_RspA response message, RN-I 206-1 sends a Wr_DataA data message to CXRA 208-1 over the data channel of interconnect 100-1, which includes the first 64B of data to be written. Similarly, in response to receiving the DBID_RspB response message, RN-I 206-1 sends a Wr_DataB data message to CXRA 208-1 over the data channel of interconnect 100-1, which includes the second 64B of data to be written. In response to receiving the DBID_RspC response message, RN-I 206-1 sends a Wr_DataC data message to CXRA 208-1 over the data channel of interconnect 100-1, which includes the third 64B of data to be written. And, in response to receiving the DBID_RspD response message, RN-I 206-1 sends a Wr_DataD data message to CXRA 208-1 over the data channel of interconnect 100-1, which includes the fourth 64B of data to be written. CXRA 208-1 forwards the Wr_DataA, Wr_DataB, Wr_DataC and Wr_DataD data messages to CXHA 209-2 in order over the CCIX connection, which then forwards the Wr_DataA, Wr_DataB, Wr_DataC and Wr_DataD data messages to HN-I 204-2 in order over the data channel of interconnect 100-2.

In response to receiving the Wr_DataA data message, HN-I 204-2 sends the address to be written and the first 64B of data to be written to PCIe device 152-2 (slave interface) over the AXI write address channel (AW) and write data channel (W), respectively. Similarly, in response to receiving the Wr_DataB data message, HN-I 204-2 sends the address to be written and the second 64B of data to be written to PCIe device 152-2 (slave interface) over the AXI write address channel (AW) and write data channel (W), respectively. In response to receiving the Wr_DataC data message, HN-I 204-2 sends the address to be written and the third 64B of data to be written to PCIe device 152-2 (slave interface) over the AXI write address channel (AW) and write data channel (W), respectively. And, in response to receiving the Wr_DataD data message, HN-I 204-2 sends the address to be written and the fourth 64B of data to be written to PCIe device 152-2 (slave interface) over the AXI write address channel (AW) and write data channel (W), respectively.

After the first 64B write transaction has been completed, PCIe device 152-2 (slave interface) sends a BRespA write response to HN-I 204-2, over the write response channel, indicating the status of the first write transaction. Similarly, after the second 64B write transaction has been completed, PCIe device 152-2 (slave interface) sends a BRespB write response to HN-I 204-2, over the write response channel, indicating the status of the second write transaction. After the third 64B write transaction has been completed, PCIe device 152-2 (slave interface) sends a BRespC write response to HN-I 204-2, over the write response channel, indicating the status of the third write transaction. And, after the fourth 64B write transaction has been completed, PCIe device 152-2 (slave interface) sends a BRespD write response to HN-I 204-2, over the write response channel, indicating the status of the fourth write transaction.

In response to receiving the BRespA write response, HN-I 204-2 sends a CompA write completion response message to CXHA 209-2 over the response channel of interconnect 100-2, which forwards the CompA write completion response message to CXRA 208-1 in order over the CCIX connection, which then forwards the CompA write completion response message to RN-I 206-1 in order over the response channel of interconnect 100-1. HN-I 204-2 must wait for the BRespA write response to arrive from PCIe device 152-2 before sending the CompA write completion response message because PCIe device 152-2 is the PoS in this embodiment.

Similarly, in response to receiving the BRespB write response, HN-I 204-2 sends a CompB write completion response message to CXHA 209-2 over the response channel of interconnect 100-2, which forwards the CompB write completion response message to CXRA 208-1 in order over the CCIX connection, which then forwards the CompB write completion response message to RN-I 206-1 in order over the response channel of interconnect 100-1. HN-I 204-2 must wait for the BRespB write response to arrive from PCIe device 152-2 before sending the CompB write completion response message because PCIe device 152-2 is the PoS in this embodiment.

In response to receiving the BRespC write response, HN-I 204-2 sends a CompC write completion response message to CXHA 209-2 over the response channel of interconnect 100-2, which forwards the CompC write completion response message to CXRA 208-1 in order over the CCIX connection, which then forwards the CompC write completion response message to RN-I 206-1 in order over the response channel of interconnect 100-1. HN-I 204-2 must wait for the BRespC write response to arrive from PCIe device 152-2 before sending the CompC write completion response message because PCIe device 152-2 is the PoS in this embodiment.

And, in response to receiving the BRespD write response, HN-I 204-2 sends a CompD write completion response message to CXHA 209-2 over the response channel of interconnect 100-2, which forwards the CompD write completion response message to CXRA 208-1 in order over the CCIX connection, which then forwards the CompD write completion response message to RN-I 206-1 in order over the response channel of interconnect 100-1. HN-I 204-2 must wait for the BRespD write response to arrive from PCIe device 152-2 before sending the CompD write completion response message because PCIe device 152-2 is the PoS in this embodiment.

Finally, in response to receiving the CompD write completion response message, RN-I 206-1 sends a BResp write completion response message to PCIe device 152-1 (master interface) over the response channel. The lifetimes, $L_A$, $L_B$, $L_C$ and $L_D$ of the WriteA, WriteB, WriteC and WriteD write transactions are depicted in FIG. 5B.

As discussed above, PCIe peer-to-peer traffic may be a single, large AXI write burst (e.g., 128B, 256B, etc.) that originates from one of the PCIe devices 152-1, 152-2. This large AXI write burst must be cracked or divided into several, smaller write transactions (e.g., 64B) for transmission over interconnects 100, 100-1, 100-2 due to the small write transaction size limit (e.g., 64B) of interconnects 100, 100-1, 100-2. After transmission over interconnect 100, 100-1, 100-2, the smaller write transactions (e.g., 64B) are converted into several corresponding AXI write transactions (e.g., 64B) for transmission to the other PCIe device 152-1, 152-1. Importantly, because the original PCIe peer-to-peer write burst has been divided into several write transactions, and each write transaction includes a message header and a message body, the number of message headers required to transmit the original data over interconnects 100, 100-1, 100-2, as well as the final AXI connection to the other PCIe device 152-1, 152-1, will double (e.g., 128B AXI write burst), quadruple (e.g., 256B AXI write burst), etc. As described above, each write transaction over the interconnect requires two response messages, i.e., DBID_Rsp and Comp.

Cracking or dividing the single, large PCIe peer-to-peer write burst into multiple, smaller write transactions creates several issues including, inter alia, increased message traffic and message header overhead due to the additional messages, which reduces the usable data rate or effective bandwidth, increased processing load of the various components of the system, etc. Additionally, the multiple, smaller write transactions may become re-ordered by transmission through interconnects 100, 100-1, 100-2 due to the unordered nature of the interconnect protocol, which is generally incompatible with the AXI protocol. And, because the PCIe device 152-1 (or 152-2) that receive the PCIe peer-to-peer write burst is the POS for the write transaction, the interconnect protocol can not issue early completions for any of the smaller write transactions, which prolongs the lifetime of these write transactions (e.g., $L_A$, $L_B$, etc., depicted in FIGS. 3A, 3B, 5A, 5B).

In certain embodiments, PCIe peer-to-peer write bursts that target the same destination PCIe device, but originate from different PCIe devices, are received by different RN-Is. Each RN-I cracks the received PCIe peer-to-peer write burst into smaller write transactions, which are sent to the HN-I that services the destination PCIe device. However, the HN-I can not distinguish the smaller write transactions generated by each RN-I, so the HN-I orders all of the smaller write transactions into the same chain for transmission to the destination PCIe device, which reduces performance.

These and other factors significantly reduce the efficiency of transmitting PCIe peer-to-peer transactions, such as write bursts, through a coherent interconnect.

Embodiments of the present disclosure advantageously provide a high-efficiency message protocol for a data processing system that includes one or more interconnects. While applicable to many message protocols that pass through an interconnect, embodiments of the present disclosure advantageously improve the efficiency of PCIe peer-to-peer transactions. For example, the efficiency of PCIe peer-to-peer write bursts (both one-to-many and many-to-one) over an interconnect (both on-chip and chip-to-chip) is significantly improved by identifying and preserving the PCIe peer-to-peer write bursts, and by completing interconnect write transactions early while preserving the semantics of the interconnect protocol.

Advantageously, PCIe message header overheads caused by AXI-to-interconnect bridging are reduced, the number of transactions downstream of the HN-I is reduced by combining PCIe endpoint writes and responses, transaction streams from different RN-Is are ordered separated at the HN-I, the number of interconnect responses is reduced by combining certain interconnect responses, and the lifetimes of all but the last interconnect write transaction are significantly reduced, which improves PCIe bus utilization, efficiency and performance, improves interconnect transaction bandwidth, and reduces overall dynamic power consumption.

Figure 6A:
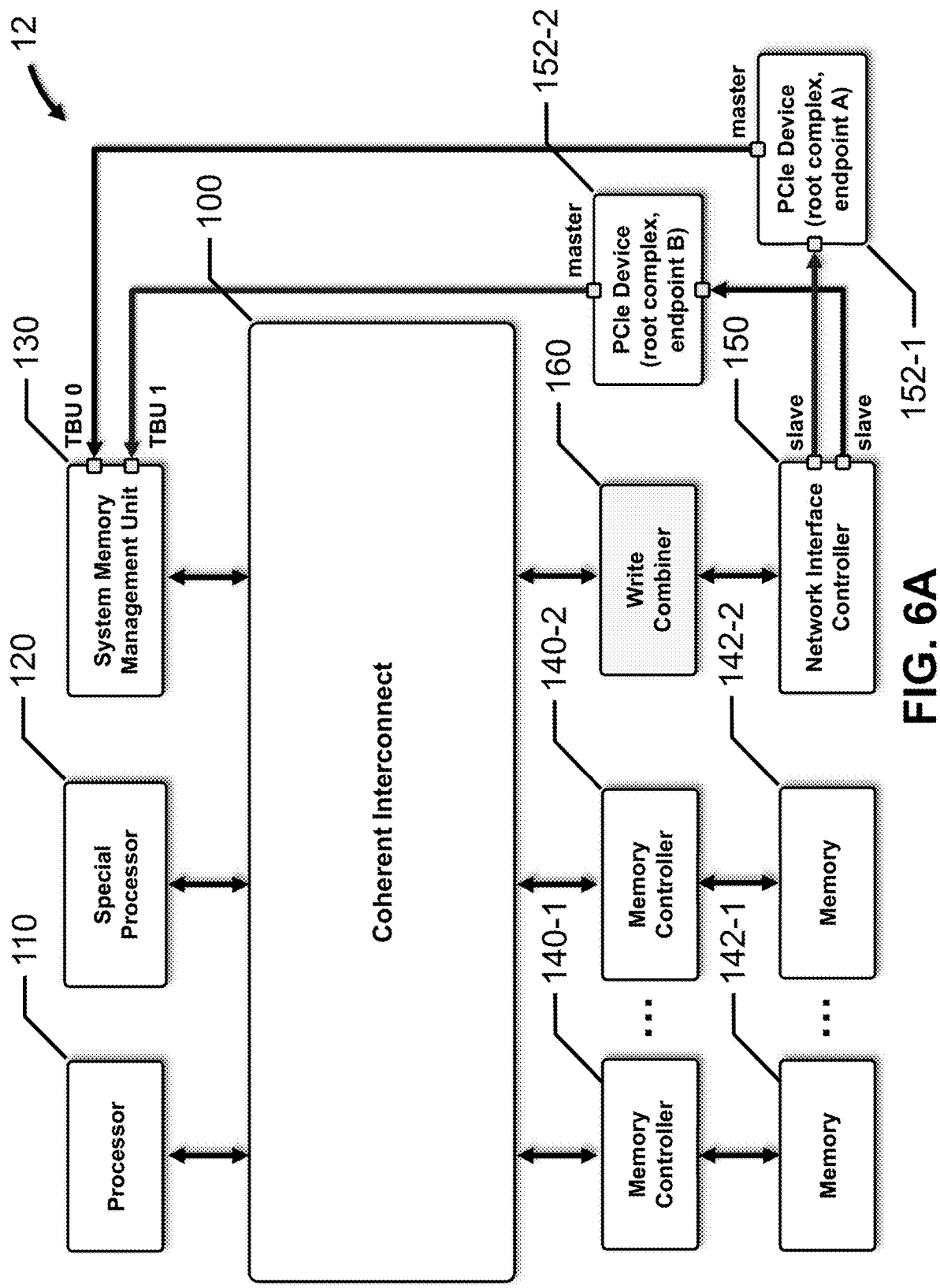
FIG. 6A depicts a block diagram for another SoC, in accordance with an embodiment of the present disclosure.

FIG. 6A depicts a block diagram for another SoC 12, in accordance with an embodiment of the present disclosure.

SoC 12 includes all of the components depicted in FIG. 1A and described above, and also includes write combiner 160. More particularly, SoC 12 includes interconnect 100 coupled to one or more processors 110, one or more accelerators or special processors 120, SMMU 130, one or more memory controllers 140-1, 140-2, etc., and NIC device 150. Each memory controller 140-1, 140-2 is coupled to a respective memory 142-1, 142-2, which may be integrated on SoC 10 or externally connected. PCIe devices 152-1, 152-2 are connected to both SMMU 130 and to NIC 150.

In this embodiment, write combiner 160 is disposed between, and coupled to, interconnect 100 and NIC 150; in other embodiments, write combiner 160 may be disposed between, and coupled to, NIC 150 and PCIe devices 152-1, 152-2. Write combiner 160 includes a microprocessor, microcontroller, ASIC, FPGA, logic circuits, etc., to provide the relevant functionality, which is discussed in detail below. In some embodiments, the functionality provided by write combiner 160 may be provided by NIC 150, as depicted in FIG. 1A.

PCIe endpoint A on PCIe device 152-1 and PCIe endpoint B on PCIe device 152-2 exchange PCIe peer-to-peer traffic through interconnect 100, SMMU 130-1, NIC 150-1 and write combiner 160-1.

Figure 6B:
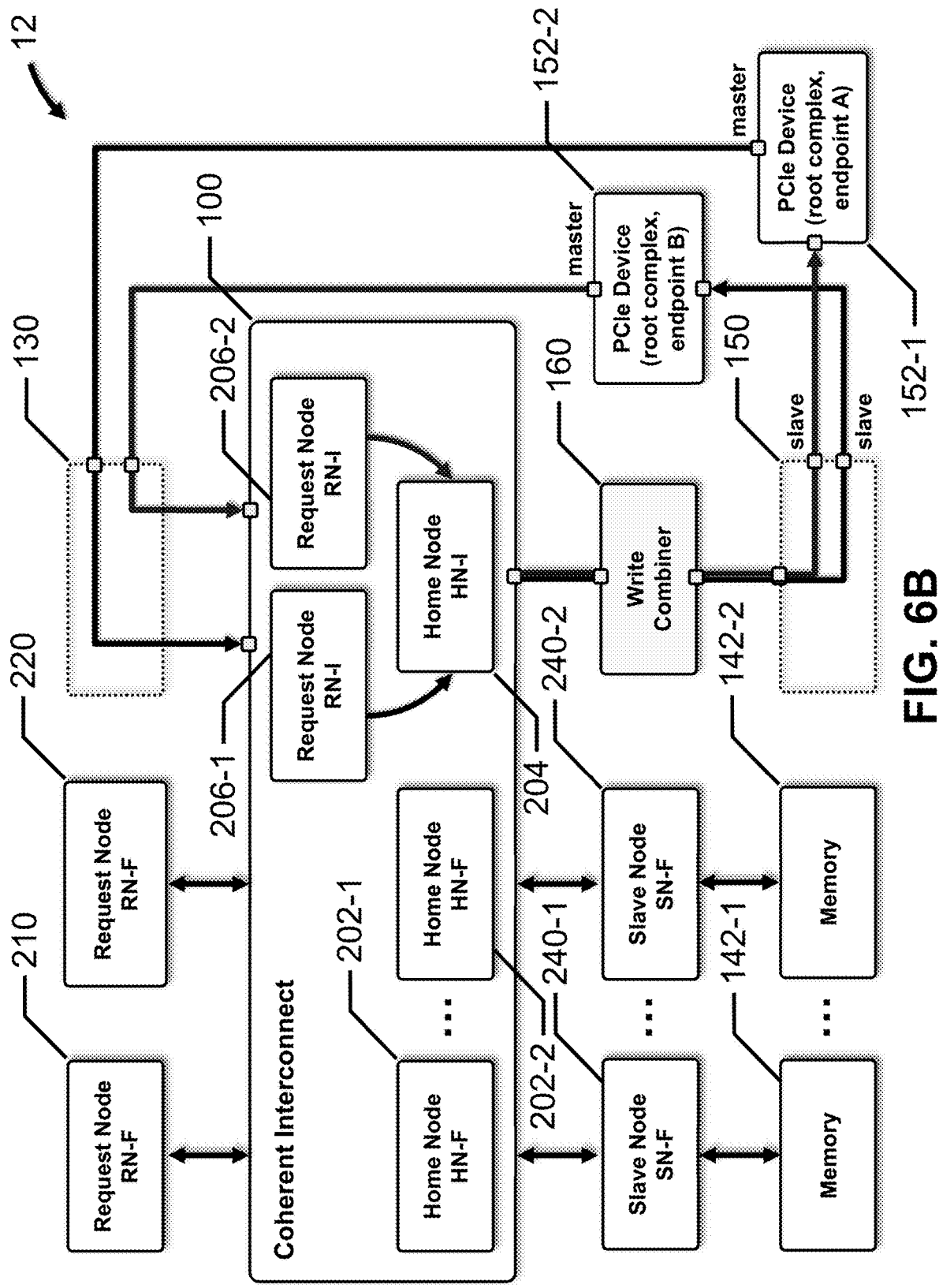
FIG. 6B depicts a block diagram for the SoC depicted in FIG. 6A using protocol node nomenclature, in accordance with an embodiment of the present disclosure.

FIG. 6B depicts a block diagram for the SoC 12 depicted in FIG. 6A using protocol node nomenclature, in accordance with an embodiment of the present disclosure.

SoC 12 includes all of the protocol nodes depicted in FIG. 1A and described above. More particularly, RN-F 210 represents processor 110, RN-F 220 represents accelerator or special processor 120, RN-I 206-1 represents PCIe device 152-1 (master interface), RN-I 206-2 represents PCIe device 152-2 (master interface), HN-F 202-1 manages the address space of memory 142-1 and is associated with SN-F 240-1 which represents memory controller 140-1, HN-F 202-2 manages the address space of memory 142-2 and is associated with SN-F 240-2 which represents memory controller 140-2, and HN-I 204 manages the address spaces for PCIe devices 152-1, 152-2 (slave interfaces). In this embodiment, NIC 150-1 acts as a bridge to the slave interfaces of PCIe devices 152-1, 152-2, and SMMU 130 acts as a bridge from RN-Is 206-1, 206-2 to the master interfaces of PCIe devices 152-1, 152-2.

Many aspects of the present disclosure contribute to removing the overhead associated with PCIe write transactions on an interconnect. Fundamentally, the RN-I maintains the OWO property of each stream (e.g., the write transaction identifier or AWID). Write transactions are always processed in order for a particular RN-I and HN-I node pair because the RN-I always processes the AXI requests in age order, the interconnect keeps the requests in the same order that the RN-I sends to the HN-I, and the HN-I processes the requests in the same order as they are received, even in the presence of retries. When a large PCIe peer-to-peer write burst is cracked into smaller transactions on the interconnect, the AXI completion (Bresp) is only dependent on the interconnect completion for last write in the burst since last write completion guarantees that all prior writes have completed. Completions for the writes which are not the last write transaction of the AXI burst have no observers and are dropped by the RN-I.

Embodiments of the present disclosure advantageously provide a write combiner that uniquely identifies the incoming write stream from the RN-I, and combines the cracked write transactions back into a single write burst. The RN-I generates a hash of the incoming write burst, e.g., a burst identifier or BurstID, which uniquely identifies a write burst at its interface, and orders the writes based on BurstID. For example, the BurstID may be the AWID, a hash of the AWID, etc. The RN-I then sends BurstID with the write stream to the HN-I, which uniquely identifies the source, based on information in the interconnect message, and generates a stream identifier or StreamID based on the BurstID and the source information. The StreamID uniquely identifies a stream.

The HN-I orders all the posted writes based on StreamID to preserve the OWO property of each stream. The write combiner combines writes with the same StreamID into bursts. The RN-I sends a last write identifier with the last interconnect transaction of the cracked burst to the HN-I. The HN-I sends the last write identifier with the last AXI write transaction to the write combiner. After the write combiner receives the last write identifier, the write combiner stops combining AXI write transactions and sends the combined AXI write burst to the PCIe device.

Multiple write bursts from a single RN-I going to multiple HN-I, as well as a single HN-I receiving multiple write bursts from multiple RN-Is, are handled in the same manner. The source information in interconnect messages and BurstID are sufficient to create a unique StreamID for each stream. This "tunneling" aspect ensures the ordering of the cracked interconnect transactions from a given stream.

Advantageously, embodiments of the present disclosure easily accommodate off-chip PCIe peer-to-peer write bursts by propagating the BurstID and RN-I source information across the chip. The HN-I's functionality remains the same.

In addition, embodiments of the present disclosure use the last write identifier in the last interconnect write of the burst at HN-I to issue completion notifications for the writes by providing a response that combines the DBID_Rsp and Comp responses into a "CompDBID_Rsp" for all but the last cracked write in the stream, even though HN-I is not the POS for the writes. The CompDBID_Rsp combined response advantageously reduces the number of response packets sent over the interconnect, as well as the lifetime for such early completed writes. The early completion feature may be especially important for embodiments that include a CCIX connection with very large latencies for off-chip transactions. The last write of the burst receives a completion response Bresp from destination PCIe device (slave interface) and incurs a full lifetime due to the full round trip delay of write completion. This ensures that all interconnect writes are complete before Bresp is sent from the RN-I to the originating PCIe device (master interface).

Figure 7A:
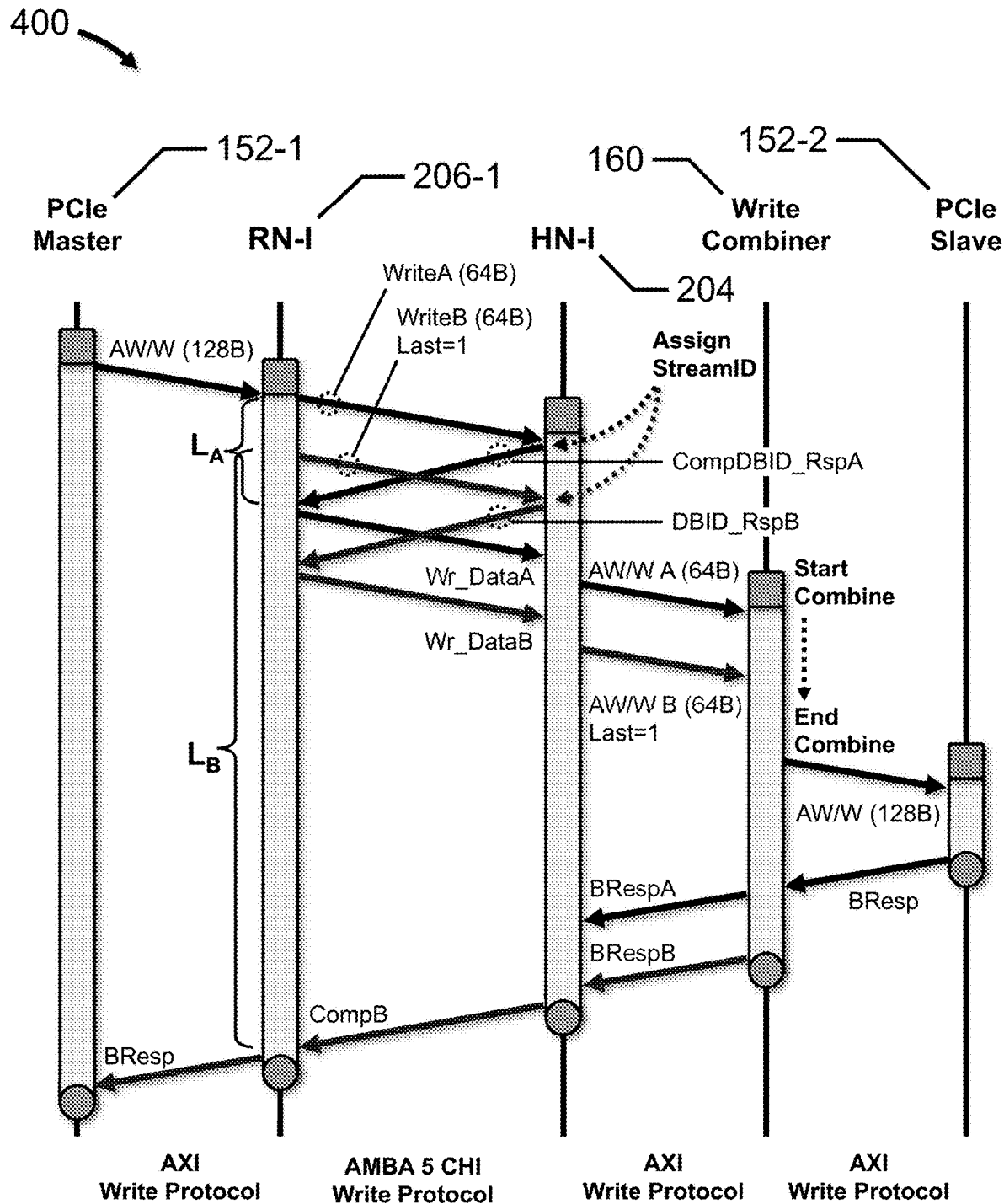
FIGS. 7A and 7B depict protocol flows for ordered write streams for the SoC depicted in FIGS. 6A and 6B, in accordance with embodiments of the present disclosure.

FIG. 7A depicts a protocol flow 400 for an ordered write stream for the SoC 10 depicted in FIGS. 6A and 6B, in accordance with an embodiment of the present disclosure.

More particularly, FIG. 7A depicts protocol flow 400 for an ordered write stream for PCIe peer-to-peer traffic flowing between PCIe endpoint A on PCIe device 152-1 and PCIe endpoint B on PCIe device 152-2. The PCIe peer-to-peer traffic flows between PCIe device 152-1 (master interface) and RN-I 206-1 through an AXI connection, between RN-I 206-1 and HN-I 204 through a CHI connection, between HN-I 204 and write combiner 160 through an AXI connection, and between write combiner 160 and PCIe device 152-2 (slave interface) through an AXI connection.

PCIe device 152-1 (master interface) sends the address to be written and the data to be written for the AXI write burst to RN-I 206-1 over the AXI write address channel (AW) and write data channel (W), respectively. The AXI write burst includes the write transaction identifier or AWID, which is transmitted over the AW channel. For example, the AWID may have a value of 0x01. Because the size of the data to be written is 128 bytes (128B), RN-I 206-1 cracks or divides the AXI write burst into an ordered write stream that includes two separate, 64 byte (64B) write transactions for transmission over the AMBA CHI connection, i.e., a WriteA request message and a WriteB request message. RN-I 206-1 also generates and adds a BurstID to the WriteA and WriteB request messages. For example, the BurstID may be a hash of the AWID and have a value of 0x10. RN-I 206-1 then sends the WriteA and WriteB request messages to HN-I 204, in order, over the request channel of interconnect 100, which include the addresses to be written and the BurstID.

Because the WriteB request message will include the last 64B write transaction for the original AXI write burst, RN-I 206-1 sends a last write identifier with the WriteB request message. For example, the value for the last write identifier may be 1. In other embodiments, the RN-I 206-1 sets the value of the last write identifier to 1 for the last write request message, sets the value of the last write identifier to 0 for the earlier write request messages, and sends the respective last write identifier with each write request message. HN-I 204 determines how many write request messages are included in the ordered write stream for this BurstID based on the last write identifier.

In response to receiving the WriteA and WriteB request messages, HN-I 204 identifies the source of the AXI write burst, i.e., PCIe device 152-1 (master interface), based on information provided in the WriteA request message, generates the StreamID based on the BurstID and the source information, and assigns the StreamID to the WriteA and WriteB request messages. For example, the StreamID may have a value of 0x11.

HN-I 204 then sends a CompDBID_RspA response message and a DBID_RspB response message to RN-I 206-1, in order, over the response channel of interconnect 100. The CompDBID_RspA response message not only provides the data buffer identifier for the WriteA request message and the StreamID, but also indicates that the WriteA write transaction is complete, which significantly reduces the lifetime $L_A$ of the WriteA write transaction, as depicted in FIG. 7A. The DBID_RspB response message provides the data buffer identifier for the WriteB request message and also includes the StreamID.

In response to receiving the CompDBID_RspA response message, RN-I 206-1 sends a Wr_DataA data message to HN-I 204 over the data channel of interconnect 100, which includes the first 64B of data to be written as well as the StreamID. Similarly, in response to receiving the DBID_RspB response message, RN-I 206-1 sends a Wr_DataB data message to HN-I 204 over the data channel of interconnect 100, which includes the second 64B of data to be written as well as the StreamID.

In response to receiving the Wr_DataA data message, HN-I 204 sends the address to be written and the first 64B of data to be written to write combiner 160 over the AXI write address channel (AW) and write data channel (W), respectively. HN-I 204 encodes the StreamID as the AWID, and sends the AWID over the AW channel. Similarly, in response to receiving the Wr_DataB data message, HN-I 204 sends the address to be written and the second 64B of data to be written to write combiner 160 over the AXI write address channel (AW) and write data channel (W), respectively. HN-I 204 encodes the StreamID as the AWID, and sends the AWID over the AW channel. Because the second AXI write request is the last 64B write transaction for the original AXI write burst, HN-I 204 sends the last write identifier over the AW channel with the second AXI write request.

In response to receiving the first AXI write request from HN-I 204, write combiner 160 identifies the StreamID and stores the first 64B of data to be written to PCIe device 152-2 in a local register, memory, etc. In response to receiving the second AXI write request from HN-I 204, write combiner 160 identifies the StreamID and appends the second 64B of data after the first 64B of data to be written to PCIe device 152-2 in the local register, memory, etc.; advantageously, 128B of data are now available for transmission to PCIe device 152-2 in a single AXI write burst. Write combiner 160 also determines that the last write identifier is set (e.g., a value of 1) in the second AXI write request. Generally, the combination process starts when the first AXI write request with a particular StreamID is received, and ends when the last write identifier is determined to be set in a subsequent AXI write request with the same StreamID. Because the last write identifier has been determined to be set in the second AXI write request, write combiner 160 completes the combination process and sends the address to be written and 128B of data to be written to PCIe device 152-2 (slave interface) over the AXI write address channel (AW) and write data channel (W), respectively.

After the 128B write transaction has been completed, PCIe device 152-2 (slave interface) sends a BResp write response to write combiner 160, over the write response channel, indicating the status of the combined write transaction. In response to receiving the BResp write response, write combiner 160 sends BRespA and BRespB write response messages to HN-I 204, in order.

In response to receiving the BRespA and BRespB write response messages, HN-I 204 sends a CompB write completion response message to RN-I 206-1 over the response channel. As discussed above, HN-I 204 already sent the BRespA write response as part of the CompDBID_RspA message, which advantageously reduced the lifetime $L_A$ of the WriteA write transaction.

Finally, in response to receiving the CompB write completion response message, RN-I 206-1 sends a BResp write completion response message to PCIe device 152-1 (master interface) over the response channel. The lifetime, $L_B$, of the WriteB write transaction is also depicted in FIG. 7A.

As mentioned above, in some embodiments, the functionality provided by write combiner 160 may be provided by NIC 150 depicted in FIG. 1A. In these embodiments, the functionality provided by RN-I 206-1 and HN-I 204 (discussed with respect to FIG. 7A), may be provided by RN-I 206-1 and HN-I 204 (discussed with respect to FIG. 1B).

Figure 7B:
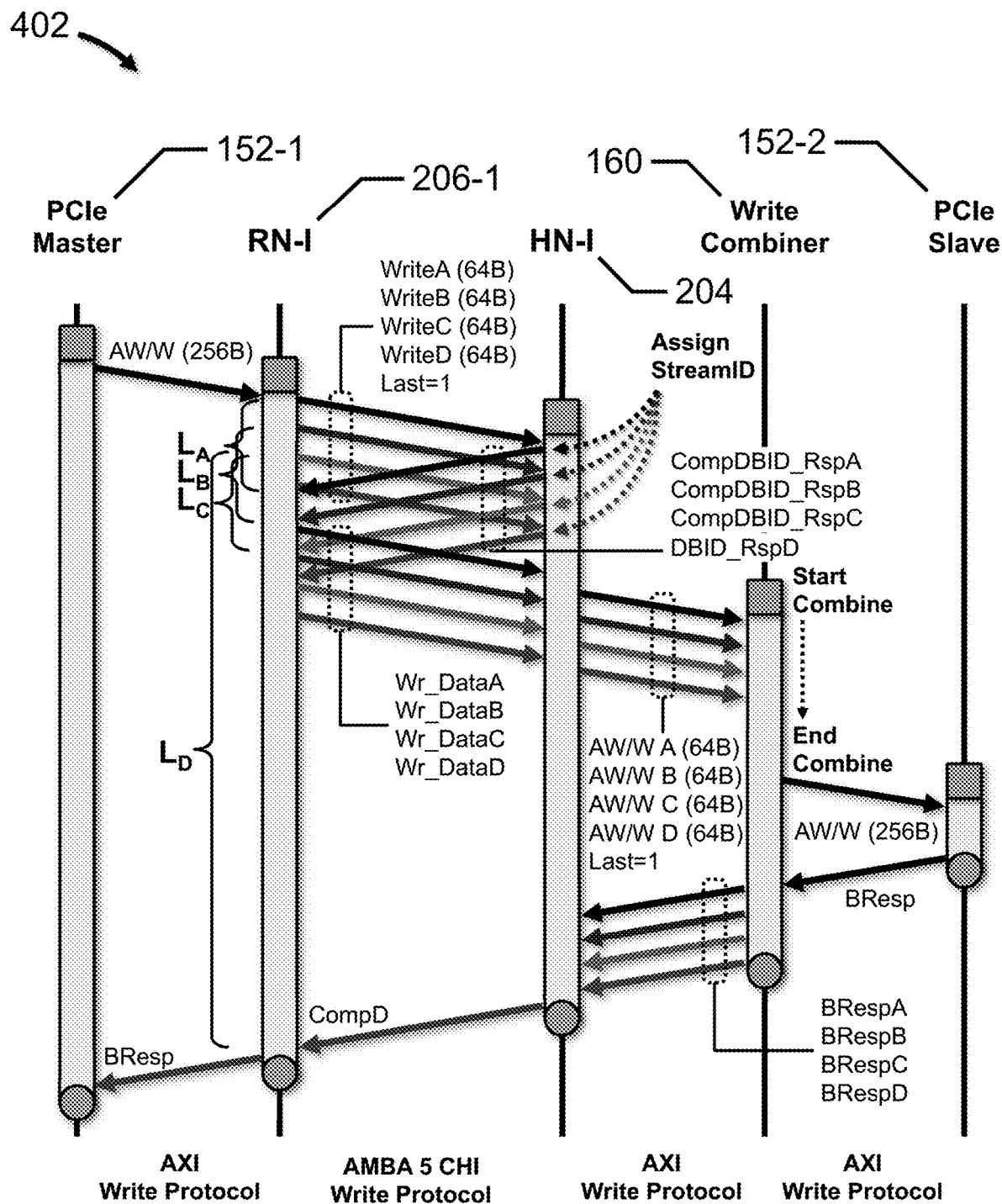

FIG. 7B depicts a protocol flow 402 for an ordered write stream for the SoC 10 depicted in FIGS. 6A and 6B, in accordance with an embodiment of the present disclosure.

Protocol flow 402 illustrates an ordered write stream for PCIe peer-to-peer traffic flowing between PCIe endpoint A on PCIe device 152-1 and PCIe endpoint B on PCIe device 152-2. The PCIe peer-to-peer traffic flows between PCIe device 152-1 (master interface) and RN-I 206-1 through an AXI connection, between RN-I 206-1 and HN-I 204 through a CHI connection, between HN-I 204 and write combiner 160 through an AXI connection, and between write combiner 160 and PCIe device 152-2 (slave interface) through an AXI connection.

PCIe device 152-1 (master interface) sends the address to be written and the data to be written for the AXI write burst to RN-I 206-1 over the AXI write address channel (AW) and write data channel (W), respectively. The AXI write burst includes the write transaction identifier or AWID, which is transmitted over the AW channel. For example, the AWID may have a value of 0x01. Because the size of the data to be written is 256 bytes (256B), RN-I 206-1 cracks or divides the AXI write burst into four separate, 64 byte (64B) write transactions for transmission over the AMBA CHI connection, i.e., WriteA, WriteB, WriteC and WriteD request messages. RN-I 206-1 also generates and adds a BurstID to the WriteA, WriteB, WriteC and WriteD request messages. For example, the BurstID may be a hash of the AWID and have a value of 0x10. RN-I 206-1 then sends WriteA, WriteB, WriteC and WriteD request messages to HN-I 204, in order, over the request channel of interconnect 100, which include the addresses to be written and the BurstID.

Because the WriteD request message will include the last 64B write transaction for the original AXI write burst, RN-I 206-1 sends the last write identifier with the WriteD request message. HN-I 204 determines how many write request messages are included in the ordered write stream for this BurstID based on the last write identifier.

In response to receiving the WriteA, WriteB, WriteC and WriteD request messages, HN-I 204 identifies the source of the AXI write burst, i.e., PCIe device 152-1 (master interface), based on information provided in the WriteA request message, generates the StreamID based on the BurstID and the source information, and assigns the StreamID to the WriteA, WriteB, WriteC and WriteD request messages. For example, the StreamID may have a value of 0x11.

HN-I 204 then sends CompDBID_RspA, CompDBID_RspB and CompDBID_RspC response messages and a DBID_RspD response message to RN-I 206-1, in order, over the response channel of interconnect 100. The CompDBID_RspA, CompDBID_RspB and CompDBID_RspC response messages not only provide the data buffer identifier for the WriteA, WriteB and WriteC request messages and the StreamID, but also indicates that the WriteA, WriteB and WriteC write transactions are complete, which significantly reduces the lifetimes $L_A$, $L_B$ and $L_C$ of the WriteA, WriteB and WriteC write transactions, as depicted in FIG. 7A. The DBID_RspD response message provides the data buffer identifier for the WriteD write message and also includes the StreamID.

In response to receiving the CompDBID_RspA response message, RN-I 206-1 sends a Wr_DataA data message to HN-I 204 over the data channel of interconnect 100, which includes the first 64B of data to be written as well as the StreamID. Similarly, in response to receiving the CompDBID_RspB response message, RN-I 206-1 sends a Wr_DataB data message to HN-I 204 over the data channel of interconnect 100, which includes the second 64B of data to be written as well as the StreamID. In response to receiving the CompDBID_RspC response message, RN-I 206-1 sends a Wr_DataC data message to HN-I 204 over the data channel of interconnect 100, which includes the third 64B of data to be written as well as the StreamID. And, in response to receiving the DBID_RspD response message, RN-I 206-1 sends a Wr_DataB data message to HN-I 204 over the data channel of interconnect 100, which includes the fourth 64B of data to be written as well as the StreamID.

In response to receiving the Wr_DataA data message, HN-I 204 sends the address to be written and the first 64B of data to be written to write combiner 160 over the AXI write address channel (AW) and write data channel (W), respectively. HN-I 204 encodes the StreamID as the AWID, and sends the AWID over the AW channel. Similarly, in response to receiving the Wr_DataB data message, HN-I 204 sends the address to be written and the second 64B of data to be written to write combiner 160 over the AXI write address channel (AW) and write data channel (W), respectively. HN-I 204 encodes the StreamID as the AWID, and sends the AWID over the AW channel. In response to receiving the Wr_DataC data message, HN-I 204 sends the address to be written and the third 64B of data to be written to write combiner 160 over the AXI write address channel (AW) and write data channel (W), respectively. HN-I 204 encodes the StreamID as the AWID, and sends the AWID over the AW channel. And, in response to receiving the Wr_DataD data message, HN-I 204 sends the address to be written and the fourth 64B of data to be written to write combiner 160 over the AXI write address channel (AW) and write data channel (W), respectively. HN-I 204 encodes the StreamID as the AWID, and sends the AWID over the AW channel.

Because the fourth AXI write request is the last 64B write transaction for the original AXI write burst, HN-I 204 sends the last write identifier over the AW channel with the fourth AXI write request.

In response to receiving the first AXI write request from HN-I 204, write combiner 160 identifies the StreamID and stores the first 64B of data to be written to PCIe device 152-2 in a local register, memory, etc. In response to receiving the second AXI write request from HN-I 204, write combiner 160 identifies the StreamID and appends the second 64B of data after the first 64B of data to be written to PCIe device 152-2 in the local register, memory, etc. In response to receiving the third AXI write request from HN-I 204, write combiner 160 identifies the StreamID and appends the third 64B of data after the second 64B of data to be written to PCIe device 152-2 in the local register, memory, etc. And, in response to receiving the fourth AXI write request from HN-I 204, write combiner 160 identifies the StreamID and appends the fourth 64B of data after the third 64B of data to be written to PCIe device 152-2 in the local register, memory, etc.

Advantageously, 256B of data are now available for transmission to PCIe device 152-2 in a single AXI write burst. Write combiner 160 also determines that the last write identifier is set (e.g., a value of 1) in the fourth AXI write request. Generally, the combination process starts when the first AXI write request with a particular StreamID is received, and ends when the last write identifier is determined to be set in a subsequent AXI write request with the same StreamID. Because the last write identifier has been determined to be set in the fourth AXI write request, write combiner 160 completes the combination process and sends the address to be written and 256B of data to be written to PCIe device 152-2 (slave interface) over the AXI write address channel (AW) and write data channel (W), respectively.

After the 256B write transaction has been completed, PCIe device 152-2 (slave interface) sends a BResp write response to write combiner 160, over the write response channel, indicating the status of the combined write transaction. In response to receiving the BResp write response, write combiner 160 sends BRespA, BRespB, BRespC and BRespD write response messages to HN-I 204, in order.

In response to receiving the BRespA, BRespB, BRespC and BRespD write response messages, HN-I 204 sends a CompD write completion response message to RN-I 206-1 over the response channel. As discussed above, HN-I 204 already sent the BRespA, BRespB and BRespC write response as part of the CompDBID_RspA, CompDBID_RspB and CompDBID_RspC messages, which advantageously reduced the lifetimes $L_A$, $L_B$ and $L_C$ of the WriteA, WriteB and WriteC write transactions.

Finally, in response to receiving the CompD write completion response message, RN-I 206-1 sends a BResp write completion response message to PCIe device 152-1 (master interface) over the response channel. The lifetime, Lo, of the WriteD write transaction is also depicted in FIG. 7A.

As mentioned above, in some embodiments, the functionality provided by write combiner 160 may be provided by NIC 150 depicted in FIG. 1A. In these embodiments, the functionality provided by RN-I 206-1 and HN-I 204 (discussed with respect to FIG. 7B), may be provided by RN-I 206-1 and HN-I 204 (discussed with respect to FIG. 1B).

Figure 8:
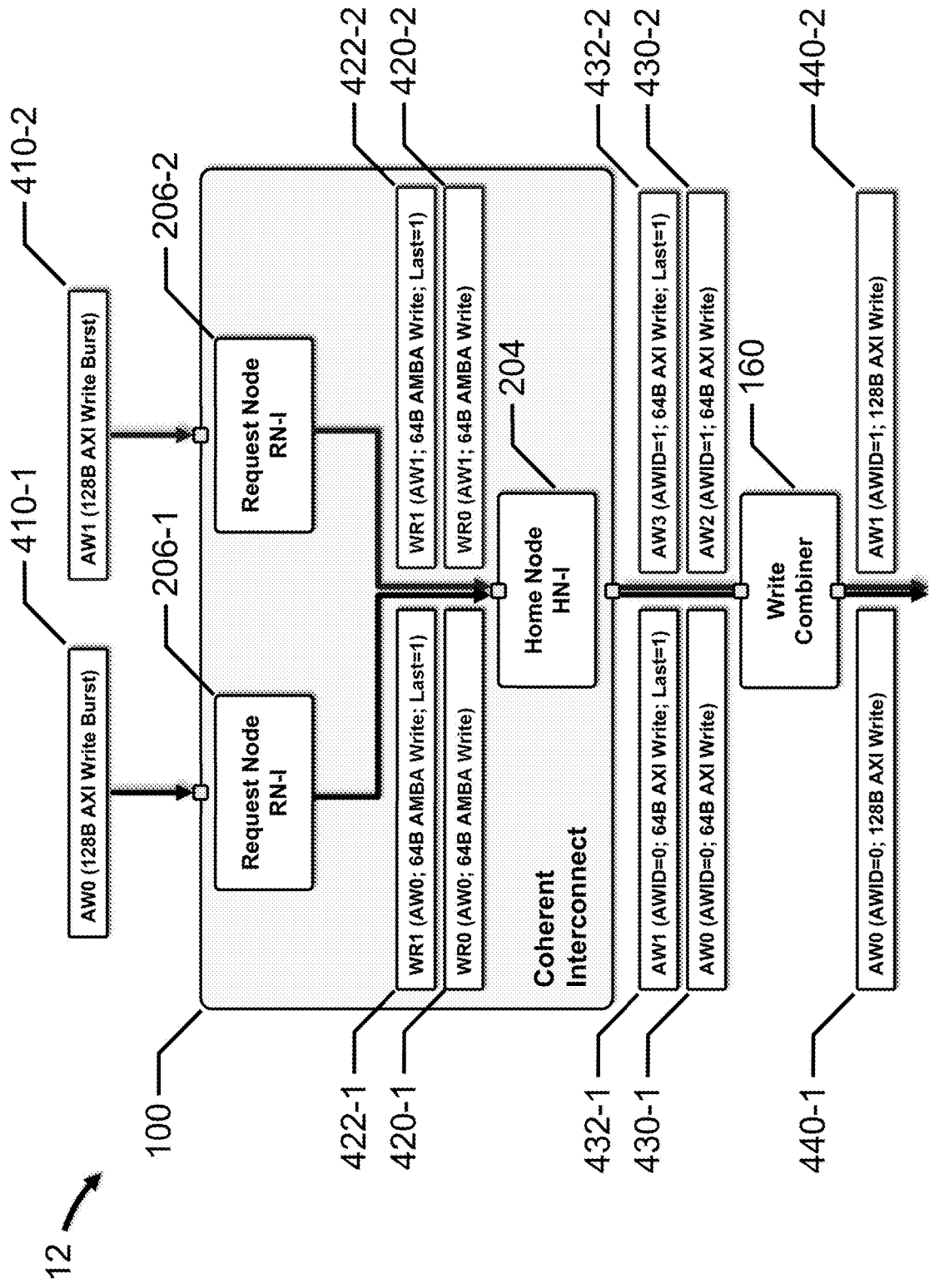
FIG. 8 depicts a portion of the block diagram depicted in FIG. 6B, in accordance with an embodiment of the present disclosure.

FIG. 8 depicts a portion of the block diagram depicted in FIG. 6B, in accordance with an embodiment of the present disclosure.

Generally, FIG. 8 illustrates two ordered write streams for PCIe peer-to-peer traffic flowing between PCIe endpoint A on PCIe device 152-1 and PCIe endpoint B on PCIe device 152-2. In the first ordered write stream, the PCIe peer-to-peer traffic flows between PCIe device 152-1 (master interface) and RN-I 206-1 through an AXI connection, between RN-I 206-1 and HN-I 204 through a CHI connection, between HN-I 204 and write combiner 160 through an AXI connection, and between write combiner 160 and PCIe device 152-2 (slave interface) through an AXI connection. In the second ordered write stream, the PCIe peer-to-peer traffic flows between PCIe device 152-2 (master interface) and RN-I 206-2 through an AXI connection, between RN-I 206-2 and HN-I 204 through a CHI connection, between HN-I 204 and write combiner 160 through an AXI connection, and between write combiner 160 and PCIe device 152-1 (slave interface) through an AXI connection.

More particularly, a first 128B AXI write burst 410-1 arrives at RN-I 206-1 from PCIe device 152-1 (master interface), and a second 128B AXI write burst 410-2 arrives at RN-I 206-2 from PCIe device 152-2 (master interface). Because the size of the data to be written is 128 bytes (128B), RN-I 206-1 cracks or divides the first AXI write burst 410-1 into two separate, 64 byte (64B) write transactions 420-1, 422-2 for transmission over the AMBA CHI connection to HN-I 204 as a first ordered write stream, and RN-I 206-2 cracks or divides the second AXI write burst 410-2 into two separate, 64 byte (64B) write transactions 420-2, 422-2 for transmission over the AMBA CHI connection to HN-I 204 as a second ordered write stream. RN-I 206-1 includes the last write identifier with the second 64B write transaction 422-1, while RN-I 206-2 includes the last write identifier with the second 64B write transaction 422-2.

HN-I 204 identifies the source of each ordered write stream, and generates a StreamID for each ordered write stream. After the exchange of WriteA and WriteB request messages, CompDBID_RspA and a DBID_RspB response messages, and Wr_DataA and Wr_DataB data messages for each write stream (as described above), HN-I 204 sends a first ordered pair of 64B AXI write requests 430-1, 432-1 and a second ordered pair of 64B AXI write requests 430-2, 432-2 to write combiner 160. HN-I 204 includes the last write identifier with the second AXI write requests 432-1, 432-2.

Write combiner 160 combines the first ordered pair of 64B AXI write requests 430-1, 432-1 into a 128B AXI write request 440-1 for the first ordered write stream, and combines the second ordered pair of 64B AXI write requests 430-2, 432-2 into a 128B AXI write request 440-2 for the second ordered write stream. The 128B AXI write request 440-1 for the first AXI write burst 410-1, which originated from PCIe device 152-1 (master interface), is sent to PCIe device 152-2 (slave interface), while the 128B AXI write request 440-2 for the second AXI write burst 410-2, which originated from PCIe device 152-2 (master interface), is sent to PCIe device 152-1 (slave interface).

Figure 9A:
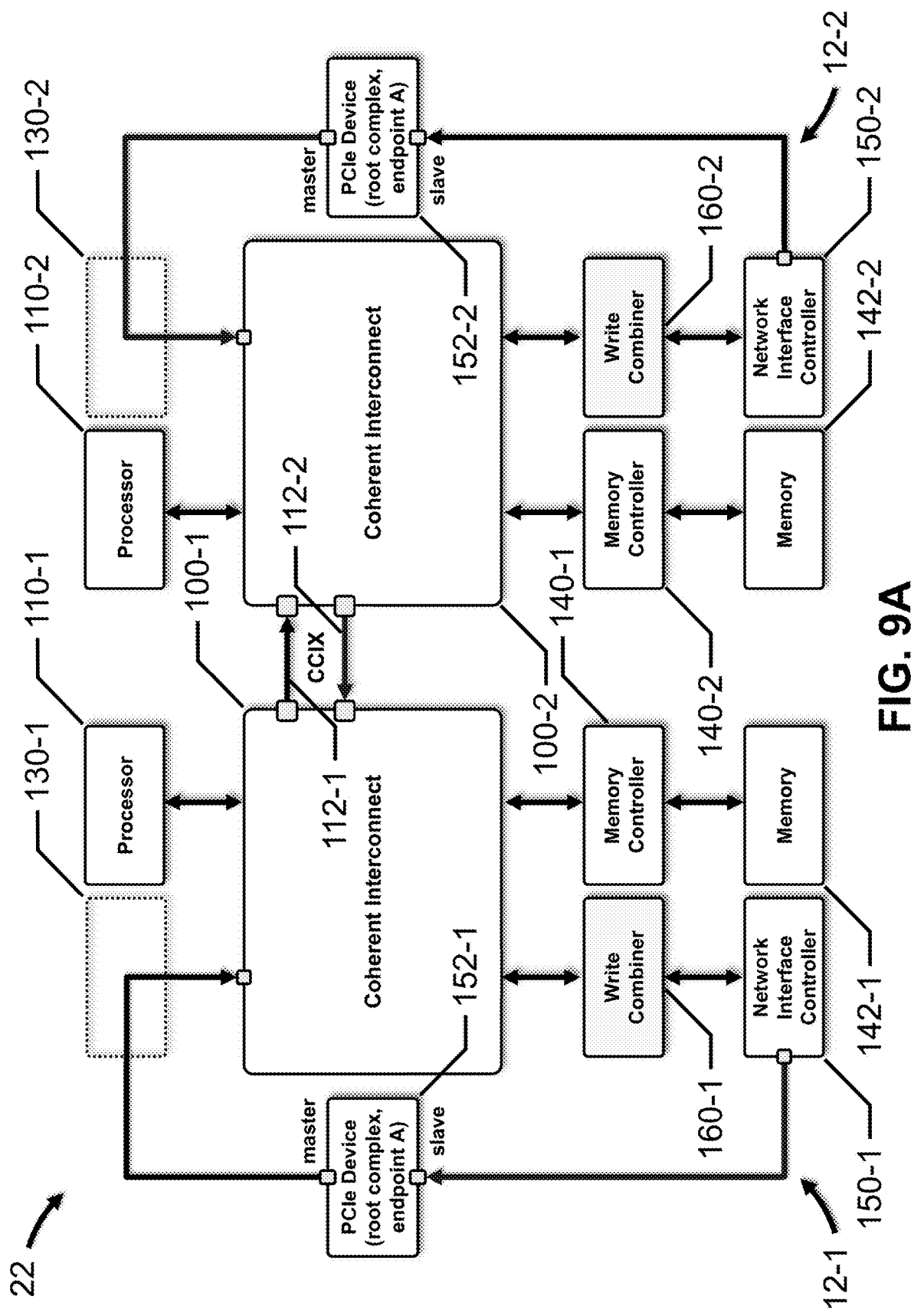
FIG. 9A depicts a block diagram for another a system with two interconnected SoCs, in accordance with an embodiment of the present disclosure.

FIG. 9A depicts a block diagram for another system 22 with two interconnected SoCs, in accordance with an embodiment of the present disclosure.

System 22 includes all of the components depicted in FIG. 4A and described above, and also includes write combiners 160-1, 160-2. SoC 12-2 and SoC 12-2 are depicted as including a baseline number of components; in other embodiments, SoC 12-1 and SoC 12-2 may include additional components, such as, for example, accelerator of special processor 120, etc. Additional SoCs 12 may be easily added to system 22, as discussed below.

More particularly, SoC 12-1 includes interconnect 100-1 coupled to one or more processors 110-1, memory controller 140-1, and NIC device 150-1. Memory controller 140-1 is coupled to memory 142-1, which may be integrated on SoC 12-1 or externally connected. PCIe device 152-1 (slave interface) is connected to NIC 150-1. In certain embodiments, SoC 12-1 may include SMMU 130-1 (depicted in phantom outline), which connects interconnect 100-1 to PCIe device 152-1 (master interface); in other embodiments, interconnect 100-1 may be directly connected to PCIe device 152-1 (master interface).

In this embodiment, write combiner 160-1 is disposed between, and coupled to, interconnect 100-1 and NIC 150-1; in other embodiments, write combiner 160-1 may be disposed between, and coupled to, NIC 150-1 and PCIe device 152-1 (slave interface). Write combiner 160-1 includes a microprocessor, microcontroller, ASIC, FPGA, logic circuits, etc., to provide the relevant functionality, which is discussed in detail below. In some embodiments, the functionality provided by write combiner 160-1 may be provided by NIC 150-1, as depicted in FIG. 4A.

Similarly, SoC 12-2 includes interconnect 100-2 coupled to one or more processors 110-2, memory controller 140-2, and NIC device 150-2. Memory controller 140-2 is coupled to memory 142-2, which may be integrated on SoC 12-2 or externally connected. PCIe device 152-2 (slave interface) is connected to NIC 150-2. In certain embodiments, SoC 12-2 may include SMMU 130-2 (depicted in phantom outline), which connects interconnect 100-2 to PCIe device 152-2 (master interface); in other embodiments, interconnect 100-2 may be directly connected to PCIe device 152-2 (master interface).

In this embodiment, write combiner 160-2 is disposed between, and coupled to, interconnect 100-2 and NIC 150-2; in other embodiments, write combiner 160-2 may be disposed between, and coupled to, NIC 150-2 and PCIe device 152-2. Write combiner 160-2 includes a microprocessor, microcontroller, ASIC, FPGA, logic circuits, etc., to provide the relevant functionality, which is discussed in detail below. In some embodiments, the functionality provided by write combiner 160-2 may be provided by NIC 150-2, as depicted in FIG. 4A.

Interconnect 100-1 may be connected to interconnect 100-2 using two or more CCIX connections 112-1, 112-2; other types of connections are also contemplated. In the embodiment depicted in FIG. 9A, two CCIX connections 112-1 and 112-2 are depicted, one connection for each traffic direction. In other embodiments, a single CCIX connection 112 may be shared by all of the traffic. Generally, one or more CCIX connections 112 form a CCIX interconnect. Additional SoCs 12 may be added to system 22 simply by adding additional CCIX connections 112 according to a particular connection topology, such as, for example, direct, switched, daisy chained, meshed, etc. PCIe endpoint A on PCIe device 152-1 and PCIe endpoint B on PCIe device 152-2 exchange PCIe peer-to-peer traffic through interconnect 100-1, CCIX connections 112-1, 112-2 and interconnect 100-2.

Figure 9B:
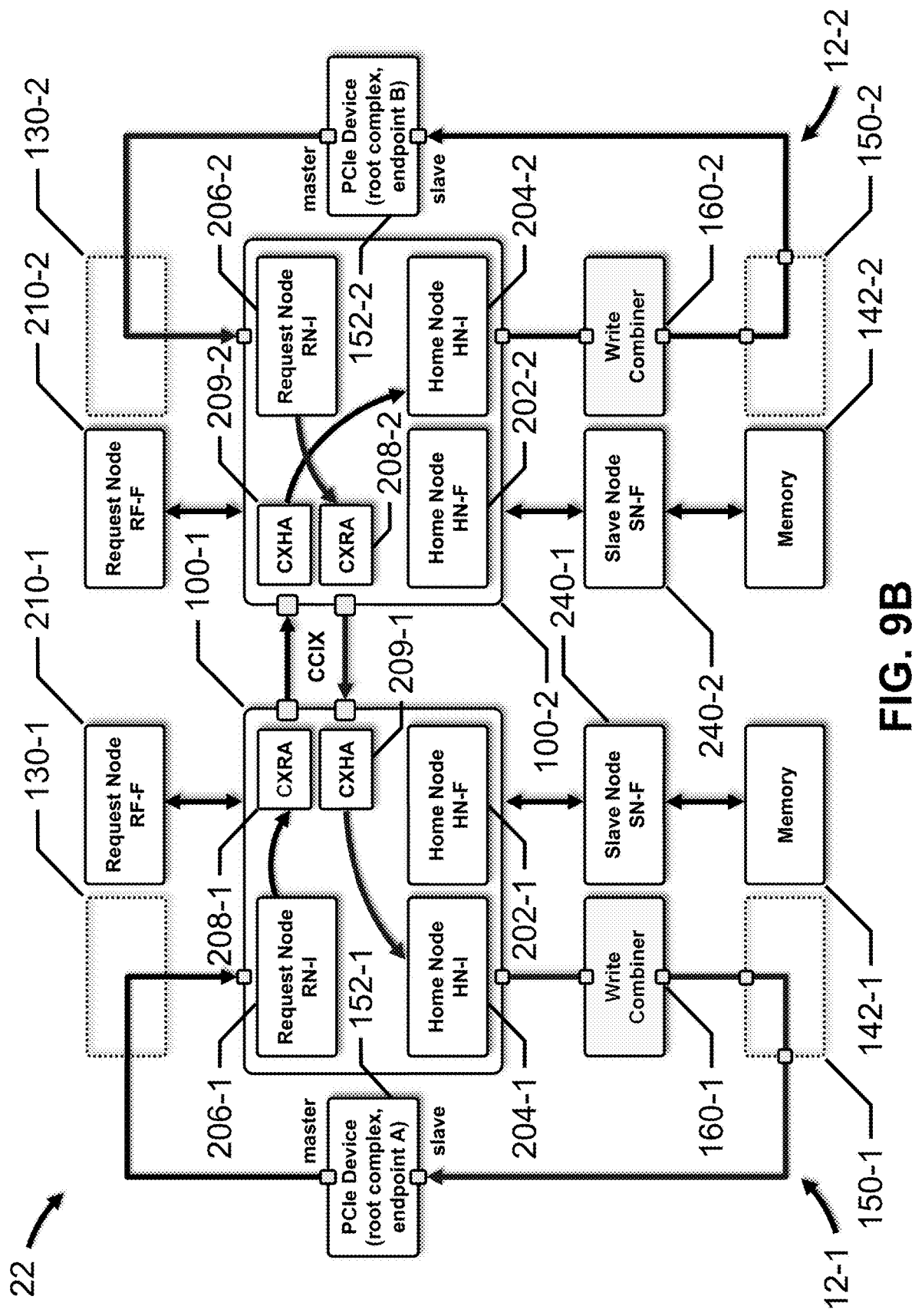
FIG. 9B depicts a block diagram for the system depicted in FIG. 9A using protocol node nomenclature, in accordance with an embodiment of the present disclosure.

FIG. 9B depicts a block diagram for the system 22 with two interconnected SoCs depicted in FIG. 9A using protocol node nomenclature, in accordance with an embodiment of the present disclosure.

System 22 includes all of the protocol nodes depicted in FIG. 4B and described above, and also includes write combiners 160-1, 160-2. More particularly, with respect to SoC 12-1, RN-F 210-1 represents processor 110-1, RN-I 206-1 represents PCIe device 152-1 (master interface), HN-F 202-1 manages the address space of memory 142-1 and is associated with SN-F 240-1 which represents memory controller 140-1, and HN-I 204 manages the address space for PCIe device 152-1 (slave interface). In this embodiment, NIC 150-1 acts as a bridge to the slave interface of PCIe device 152-1. If present, SMMU 130-1 may act as a bridge from RN-I 206-1 to the master interface of PCIe device 152-1. CXRA 208-1 performs read and write transactions over CCIX connection 112-1, and CXHA 209-1 manages coherency for CCIX connection 112-2.

With respect to SoC 12-2, RN-F 210-2 represents processor 110-2, RN-I 206-2 represents PCIe device 152-2 (master interface), HN-F 202-2 manages the address space of memory 142-2 and is associated with SN-F 240-2 which represents memory controller 140-2, and HN-I 204 manages the address space for PCIe device 152-2 (slave interface). In this embodiment, NIC 150-2 acts as a bridge to the slave interface of PCIe device 152-2. If present, SMMU 130-2 may act as a bridge from RN-I 206-2 to the master interface of PCIe device 152-2. CXRA 208-2 performs read and write transactions over CCIX connection 112-2, and CXHA 209-2 manages coherency for CCIX connection 112-1.

Figure 10A:
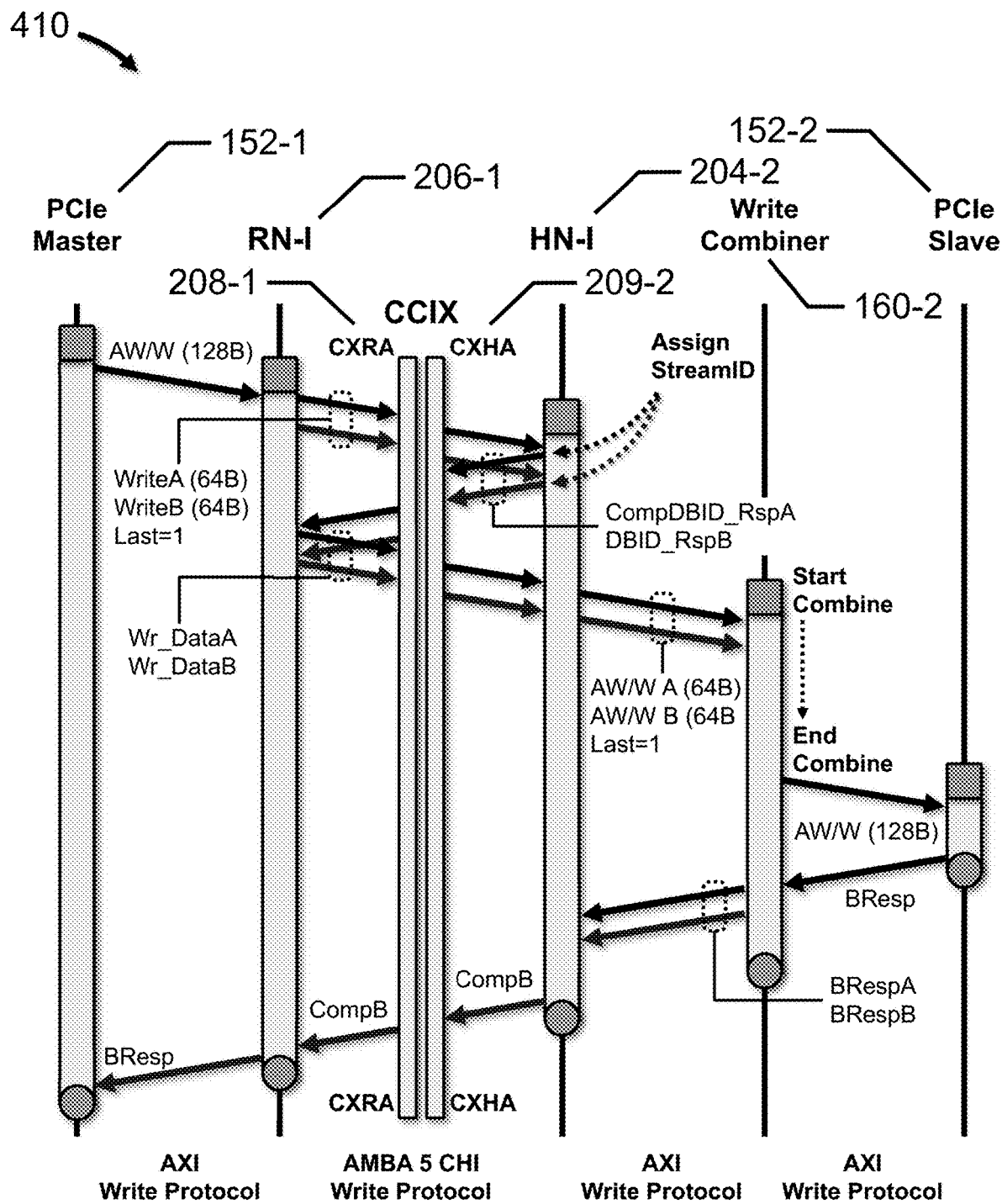
FIGS. 10A and 10B depict protocol flows for ordered write streams for the system depicted in FIGS. 9A and 9B, in accordance with embodiments of the present disclosure.

FIG. 10A depicts a protocol flow 410 for an ordered write stream for the system 22 depicted in FIGS. 9A and 9B, in accordance with an embodiment of the present disclosure.

Protocol flow 410 illustrates an ordered write stream for PCIe peer-to-peer traffic flowing between PCIe endpoint A on PCIe device 152-1 and PCIe endpoint B on PCIe device 152-2. The PCIe peer-to-peer traffic flows between PCIe device 152-1 (master interface) and RN-I 206-1 through an AXI connection, between RN-I 206-1 and CXRA 208-1 through a CHI connection on interconnect 100-1, between CXRA 208-1 and CXHA 290-2 through a CCIX connection, between CXHA 290-2 and HN-I 204-2 through a CHI connection on interconnect 100-2, between HN-I 204-2 and write combiner 160-2 through an AXI connection, and between write combiner 160-2 and PCIe device 152-2 (slave interface) through an AXI connection.

PCIe device 152-1 (master interface) sends the address to be written and the data to be written for the AXI write burst to RN-I 206-1 over the AXI write address channel (AW) and write data channel (W), respectively. The AXI write burst includes the write transaction identifier or AWID, which is transmitted over the AW channel. For example, the AWID may have a value of 0x01. Because the size of the data to be written is 128 bytes (128B), RN-I 206-1 cracks or divides the AXI write burst into two separate, 64 byte (64B) write transactions for transmission over the AMBA CHI connection, i.e., a WriteA request message and a WriteB request message. RN-I 206-1 also generates and adds a BurstID to the WriteA and WriteB request messages. For example, the BurstID may be a hash of the AWID and have a value of 0x10.

Because the WriteB request message will include the last 64B write transaction for the original AXI write burst, RN-I 206-1 sends the last write identifier with the WriteB request message. HN-I 204-2 determines how many write request messages are included in the ordered write stream for this BurstID based on the last write identifier.

RN-I 206-1 sends the WriteA and WriteB request messages to CXRA 208-1 in order over the request channel of interconnect 100-1, which include the addresses to be written. CXRA 208-1 forwards the WriteA and WriteB request messages to CXHA 209-2 in order over the CCIX connection, which then forwards the WriteA and WriteB request messages to HN-I 204-2 in order over the request channel of interconnect 100-2.

In response to receiving the WriteA and WriteB request messages, HN-I 204-2 identifies the source of the AXI write burst, i.e., PCIe device 152-1 (master interface), based on information provided in the WriteA request message, generates the StreamID based on the BurstID and the source information, and assigns the StreamID to the WriteA and WriteB request messages. For example, the StreamID may have a value of 0x11.

HN-I 204-2 then sends a CompDBID_RspA response message and a DBID_RspB response message to CXHA 209-2 in order over the response channel of interconnect 100-2, which provides the data buffer identifiers and StreamID for each write transaction. CXHA 209-2 forwards the CompDBID_RspA and DBID_RspB response messages to CXRA 208-1 in order over the CCIX connection, which then forwards the CompDBID_RspA and DBID_RspB response messages to RN-I 206-1 in order over the response channel of interconnect 100-1.

The CompDBID_RspA response message not only provides the data buffer identifier for the WriteA request message and the StreamID, but also indicates that the WriteA write transaction is complete, which significantly reduces the lifetime $L_A$ of the WriteA write transaction, as depicted in FIG. 10A. The DBID_RspB response message provides the data buffer identifier for the WriteB request message and also includes the StreamID.

In response to receiving the CompDBID_RspA response message, RN-I 206-1 sends a Wr_DataA data message to CXRA 208-1 over the data channel of interconnect 100-1, which includes the first 64B of data to be written. Similarly, in response to receiving the DBID_RspB response message, RN-I 206-1 sends a Wr_DataB data message to CXRA 208-1 over the data channel of interconnect 100-1, which includes the second 64B of data to be written. CXRA 208-1 forwards the Wr_DataA and Wr_DataB data messages to CXHA 209-2 in order over the CCIX connection, which then forwards the Wr_DataA and Wr_DataB data messages to HN-I 204-2 in order over the data channel of interconnect 100-2.

In response to receiving the Wr_DataA data message, HN-I 204-2 sends the address to be written and the first 64B of data to be written to write combiner 160-2 over the AXI write address channel (AW) and write data channel (W), respectively. HN-I 204-2 encodes the StreamID as the AWID, and sends the AWID over the AW channel. Similarly, in response to receiving the Wr_DataB data message, HN-I 204-2 sends the address to be written and the second 64B of data to be written to write combiner 160-2 over the AXI write address channel (AW) and write data channel (W), respectively. HN-I 204-2 encodes the StreamID as the AWID, and sends the AWID over the AW channel. Because the second AXI write request is the last 64B write transaction for the original AXI write burst, HN-I 204-2 sends the last write identifier over the AW channel with the second AXI write request.

In response to receiving the first AXI write request from HN-I 204, write combiner 160-2 identifies the StreamID and stores the first 64B of data to be written to PCIe device 152-2 in a local register, memory, etc. In response to receiving the second AXI write request from HN-I 204-2, write combiner 160-2 identifies the StreamID and appends the second 64B of data after the first 64B of data to be written to PCIe device 152-2 in the local register, memory, etc.; advantageously, 128B of data are now available for transmission to PCIe device 152-2 in a single AXI write burst. Write combiner 160-2 also determines that the last write identifier is set (e.g., a value of 1) in the second AXI write request. Generally, the combination process starts when the first AXI write request with a particular StreamID is received, and ends when the last write identifier is determined to be set in a subsequent AXI write request with the same StreamID. Because the last write identifier has been determined to be set in the second AXI write request, write combiner 160-2 completes the combination process and sends the address to be written and 128B of data to be written to PCIe device 152-2 (slave interface) over the AXI write address channel (AW) and write data channel (W), respectively.

After the 128B write transaction has been completed, PCIe device 152-2 (slave interface) sends a BResp write response to write combiner 160-2, over the write response channel, indicating the status of the combined write transaction. In response to receiving the BResp write response, write combiner 160-2 sends BRespA and BRespB write response messages to HN-I 204-2, in order.

In response to receiving the BRespB write response, HN-I 204-2 sends a CompB write completion response message to CXHA 209-2 over the response channel of interconnect 100-2, which forwards the CompB write completion response message to CXRA 208-1 in order over the CCIX connection, which then forwards the CompB write completion response message to RN-I 206-1 in order over the response channel of interconnect 100-1. HN-I 204-2 must wait for the BRespB write response to arrive from PCIe device 152-2 before sending the CompB write completion response message because PCIe device 152-2 is the PoS in this embodiment.

Finally, in response to receiving the CompB write completion response message, RN-I 206-1 sends a BResp write completion response message to PCIe device 152-1 (master interface) over the response channel. The lifetime, $L_B$, of the WriteB write transaction is depicted in FIG. 5A.

As mentioned above, in some embodiments, the functionality provided by write combiner 160-2 may be provided by NIC 150-2 depicted in FIG. 4A. In these embodiments, the functionality provided by RN-I 206-1 and HN-I 204-2 (discussed with respect to FIG. 10A), may be provided by RN-I 206-1 and HN-I 204-2 (discussed with respect to FIG. 4B). Similarly, the functionality provided by write combiner 160-1 may be provided by NIC 150-1 depicted in FIG. 4A, etc.

Figure 10B:
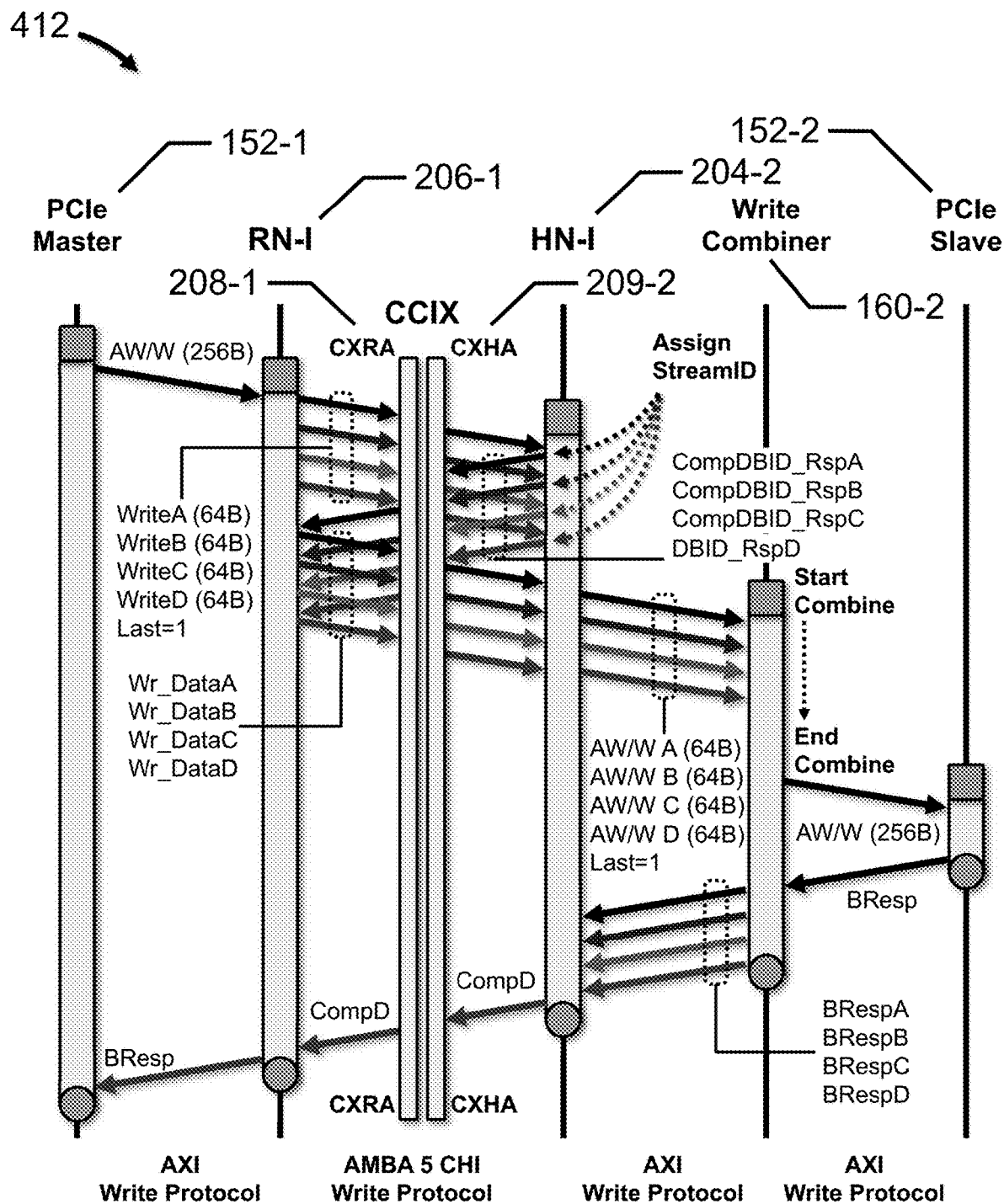

FIG. 10B depicts a protocol flow 412 for an ordered write stream for the system 22 depicted in FIGS. 9A and 9B, in accordance with an embodiment of the present disclosure.

Protocol flow 412 illustrates an ordered write stream for PCIe peer-to-peer traffic flowing between PCIe endpoint A on PCIe device 152-1 and PCIe endpoint B on PCIe device 152-2. The PCIe peer-to-peer traffic flows between PCIe device 152-1 (master interface) and RN-I 206-1 through an AXI connection, between RN-I 206-1 and CXRA 208-1 through a CHI connection on interconnect 100-1, between CXRA 208-1 and CXHA 290-2 through a CCIX connection, between CXHA 290-2 and HN-I 204-2 through a CHI connection on interconnect 100-2, between HN-I 204-2 and write combiner 160-2 through an AXI connection, and between write combiner 160-2 and PCIe device 152-2 (slave interface) through an AXI connection.

PCIe device 152-1 (master interface) sends the address to be written and the data to be written for the AXI write burst to RN-I 206-1 over the AXI write address channel (AW) and write data channel (W), respectively. The AXI write burst includes the write transaction identifier or AWID, which is transmitted over the AW channel. For example, the AWID may have a value of 0x01. Because the size of the data to be written is 256 bytes (256B), RN-I 206-1 cracks or divides the AXI write burst into four separate, 64 byte (64B) write transactions for transmission over the AMBA CHI connection, i.e., WriteA, WriteB, WriteC and WriteD request messages. RN-I 206-1 also generates and adds a BurstID to the WriteA, WriteB, WriteC and WriteD request messages. For example, the BurstID may be a hash of the AWID and have a value of 0x10.

Because the WriteD request message will include the last 64B write transaction for the original AXI write burst, RN-I 206-1 sends the last write identifier with the WriteD request message. HN-I 204-2 determines how many write request messages are included in the ordered write stream for this BurstID based on the last write identifier.

RN-I 206-1 sends the WriteA, WriteB, WriteC and WriteD request messages to CXRA 208-1 in order over the request channel of interconnect 100-1, which include the addresses to be written. CXRA 208-1 forwards the WriteA, WriteB, WriteC and WriteD request messages to CXHA 209-2 in order over the CCIX connection, which then forwards the WriteA, WriteB, WriteC and WriteD request messages to HN-I 204-2 in order over the request channel of interconnect 100-2.

In response to receiving the WriteA, WriteB, WriteC and WriteD request messages, HN-I 204-2 identifies the source of the AXI write burst, i.e., PCIe device 152-1 (master interface), based on information provided in the WriteA request message, generates the StreamID based on the BurstID and the source information, and assigns the StreamID to the WriteA, WriteB, WriteC and WriteD request messages. For example, the StreamID may have a value of 0x11.

HN-I 204-2 then sends CompDBID_RspA, CompDBID_RspB and CompDBID_RspC response messages and a DBID_RspD response message to CXHA 209-2 in order over the response channel of interconnect 100-2, which provides the data buffer identifiers and StreamID for each write transaction. CXHA 209-2 forwards the CompDBID_RspA, CompDBID_RspB and CompDBID_RspC response messages and the DBID_RspD response message to CXRA 208-1 in order over the CCIX connection, which then forwards the CompDBID_RspA, CompDBID_RspB and CompDBID_RspC response messages and the DBID_RspB response message to RN-I 206-1 in order over the response channel of interconnect 100-1.

The CompDBID_RspA, CompDBID_RspB and CompDBID_RspC response messages not only provide the data buffer identifier for the WriteA, WriteB and WriteC request messages and the StreamID, but also indicates that the WriteA, WriteB and WriteC write transactions are complete, which significantly reduces the lifetimes $L_A$, $L_B$ and $L_C$ of the WriteA, WriteB and WriteC write transactions, as depicted in FIG. 10B. The DBID_RspD response message provides the data buffer identifier for the WriteD write message and also includes the StreamID.

In response to receiving the CompDBID_RspA response message, RN-I 206-1 sends a Wr_DataA data message to CXRA 208-1 over the data channel of interconnect 100-1, which includes the first 64B of data to be written. Similarly, in response to receiving the CompDBID_RspB response message, RN-I 206-1 sends a Wr_DataB data message to CXRA 208-1 over the data channel of interconnect 100-1, which includes the second 64B of data to be written. In response to receiving the CompDBID_RspC response message, RN-I 206-1 sends a Wr_DataC data message to CXRA 208-1 over the data channel of interconnect 100-1, which includes the third 64B of data to be written. And, in response to receiving the DBID_RspD response message, RN-I 206-1 sends a Wr_DataD data message to CXRA 208-1 over the data channel of interconnect 100-1, which includes the fourth 64B of data to be written. CXRA 208-1 forwards the Wr_DataA, Wr_DataB, Wr_DataC and Wr_DataD data messages to CXHA 209-2 in order over the CCIX connection, which then forwards the Wr_DataA, Wr_DataB, Wr_DataC and Wr_DataD data messages to HN-I 204-2 in order over the data channel of interconnect 100-2.

In response to receiving the Wr_DataA data message, HN-I 204-2 sends the address to be written and the first 64B of data to be written to write combiner 160-2 over the AXI write address channel (AW) and write data channel (W), respectively. HN-I 204-2 encodes the StreamID as the AWID, and sends the AWID over the AW channel. Similarly, in response to receiving the Wr_DataB data message, HN-I 204-2 sends the address to be written and the second 64B of data to be written to write combiner 160-2 over the AXI write address channel (AW) and write data channel (W), respectively. HN-I 204-2 encodes the StreamID as the AWID, and sends the AWID over the AW channel. In response to receiving the Wr_DataC data message, HN-I 204-2 sends the address to be written and the third 64B of data to be written to write combiner 160-2 over the AXI write address channel (AW) and write data channel (W), respectively. HN-I 204-2 encodes the StreamID as the AWID, and sends the AWID over the AW channel. And, in response to receiving the Wr_DataD data message, HN-I 204-2 sends the address to be written and the fourth 64B of data to be written to write combiner 160-2 over the AXI write address channel (AW) and write data channel (W), respectively. HN-I 204-2 encodes the StreamID as the AWID, and sends the AWID over the AW channel.

Because the fourth AXI write request is the last 64B write transaction for the original AXI write burst, HN-I 204-2 sends the last write identifier over the AW channel with the fourth AXI write request.

In response to receiving the first AXI write request from HN-I 204, write combiner 160-2 identifies the StreamID and stores the first 64B of data to be written to PCIe device 152-2 (slave interface) in a local register, memory, etc. In response to receiving the second AXI write request from HN-I 204-2, write combiner 160-2 identifies the StreamID and appends the second 64B of data after the first 64B of data to be written to PCIe device 152-2 (slave interface) in the local register, memory, etc. In response to receiving the third AXI write request from HN-I 204-2, write combiner 160-2 identifies the StreamID and appends the third 64B of data after the second 64B of data to be written to PCIe device 152-2 (slave interface) in the local register, memory, etc. And, in response to receiving the fourth AXI write request from HN-I 204-2, write combiner 160-2 identifies the StreamID and appends the fourth 64B of data after the third 64B of data to be written to PCIe device 152-2 (slave interface) in the local register, memory, etc.

Advantageously, 256B of data are now available for transmission to PCIe device 152-2 in a single AXI write burst. Write combiner 160 also determines that the last write identifier is set (e.g., a value of 1) in the fourth AXI write request. Generally, the combination process starts when the first AXI write request with a particular StreamID is received, and ends when the last write identifier is determined to be set in a subsequent AXI write request with the same StreamID. Because the last write identifier has been determined to be set in the fourth AXI write request, write combiner 160 completes the combination process and sends the address to be written and 256B of data to be written to PCIe device 152-2 (slave interface) over the AXI write address channel (AW) and write data channel (W), respectively.

After the 256B write transaction has been completed, PCIe device 152-2 (slave interface) sends a BResp write response to write combiner 160-2, over the write response channel, indicating the status of the combined write transaction. In response to receiving the BResp write response, write combiner 160-2 sends BRespA, BRespB, BRespC and BRespD write response messages to HN-I 204-2, in order.

In response to receiving the BRespD write response, HN-I 204-2 sends a CompD write completion response message to CXHA 209-2 over the response channel of interconnect 100-2, which forwards the CompD write completion response message to CXRA 208-1 in order over the CCIX connection, which then forwards the CompD write completion response message to RN-I 206-1 in order over the response channel of interconnect 100-1. HN-I 204-2 must wait for the BRespD write response to arrive from PCIe device 152-2 before sending the CompD write completion response message because PCIe device 152-2 is the PoS in this embodiment.

Finally, in response to receiving the CompD write completion response message, RN-I 206-1 sends a BResp write completion response message to PCIe device 152-1 (master interface) over the response channel. The lifetime, Lo, of the WriteD write transaction is depicted in FIG. 10B.

In the embodiments discussed above, the first write burst is an AXI write burst having a data size greater than 64 bytes, each write request is an AMBA CHI write request having a data size of 64 bytes or less, each write transaction is an AXI write transaction having a data size of 64 bytes or less, and the second write burst is an AXI write burst having a data size greater than 64 bytes. Embodiments of the present disclosure are not limited to these protocols and data sizes; other write burst protocols, interconnect protocols, data sizes, etc., are also contemplated, such as, for example, write bursts that are 64B or less, first and last write requests that have different data sizes, etc.

Figure 11:
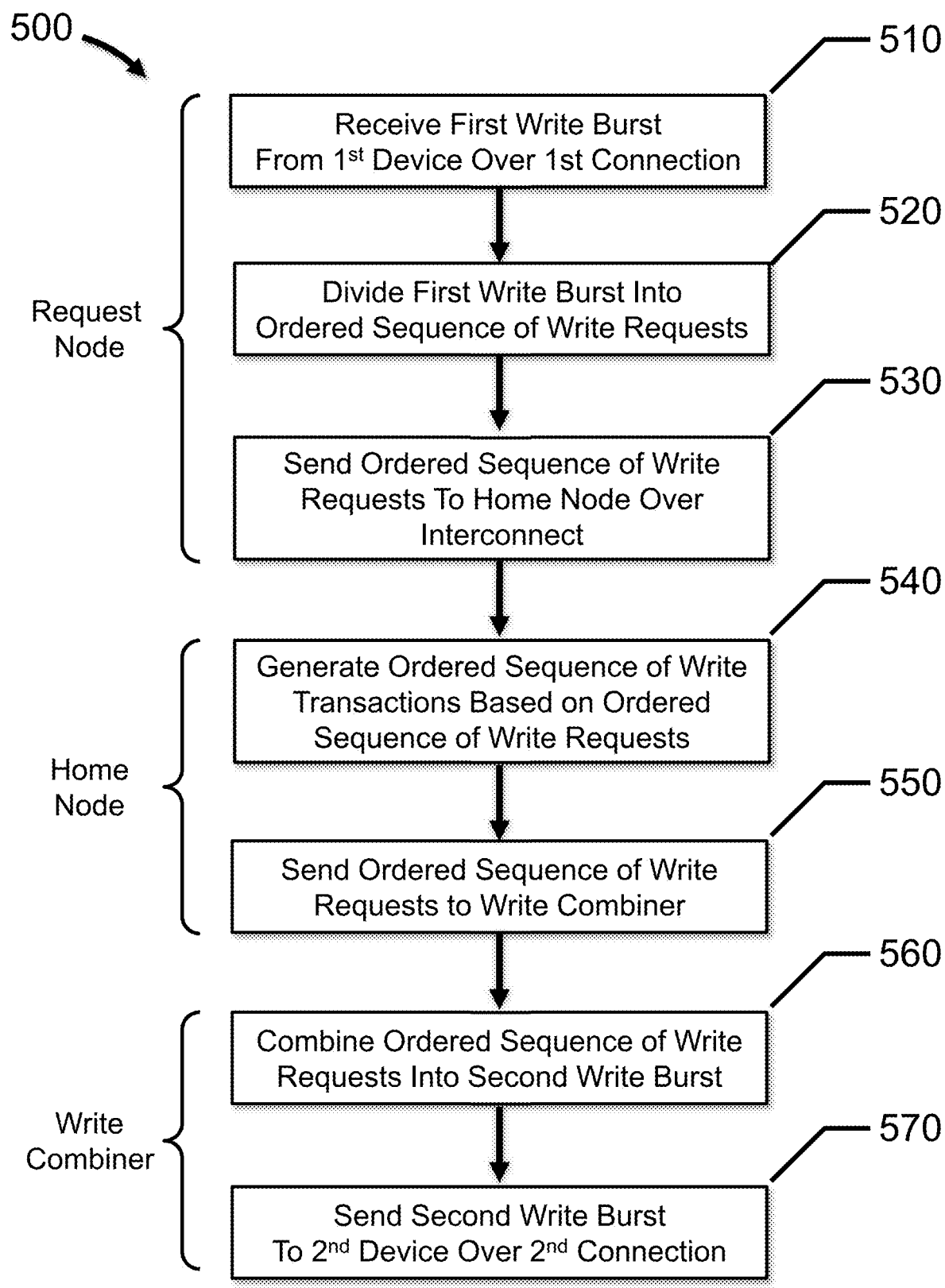
FIG. 11 depicts a flow diagram representing functionality associated with a message protocol for a data processing network, in accordance with embodiments of the present disclosure.

FIG. 11 depicts a flow diagram 500 representing functionality associated with a message protocol for a data processing network, in accordance with embodiments of the present disclosure.

The functionality at 510, 520 and 530 is performed at a request node coupled to an interconnect, the functionality at 540 and 550 is performed at a home node coupled to the interconnect, and the functionality at 560 and 570 is performed at a write combiner coupled to the home node.

At 510, a first write burst is received from a first device over a first connection. The first write burst has a data size.

At 520, the first write burst is divided into an ordered sequence of write requests based on the first write burst data size. The ordered sequence of write requests include at least a first write request and a last write request. Each write request has the same data size, which is smaller than the first write burst data size.

At 530, the ordered sequence of write requests is sent to the home node over the interconnect. The last write request includes a last write identifier.

At 540, an ordered sequence of write transactions is generated based on the ordered sequence of write requests. The ordered sequence of write transactions includes at least a first write transaction and a last write transaction. Each write transaction has a data size equal to each write request data size.

At 550, the ordered sequence of write transactions is sent to the write combiner. The last write transaction includes the last write identifier.

At 560, the ordered sequence of write transactions is combined into a second write burst based on at least the last write identifier. The second write burst has a data size equal to the first write burst data size.

At 570, the second write burst is sent to a second device over a second connection.

Embodiments of the present disclosure advantageously provide a high efficiency message protocol for a data processing system that includes one or more interconnects. While applicable to many message protocols that may pass through an interconnect, embodiments of the present disclosure advantageously improve the efficiency of PCIe peer-to-peer transactions, as discussed in detail below.

The embodiments described above and summarized below are combinable.

In one embodiment, a computer-based method for transferring data over at least one interconnect is provided. At a request node coupled to an interconnect: a first write burst is received from a first device over a first connection; the first write burst is divided into an ordered sequence of write requests based on the first write burst data size, the ordered sequence of write requests including at least a first write request and a last write request, each write request having a data size that is smaller than a first write burst data size; and the ordered sequence of write requests is sent to a home node coupled to the interconnect, the last write request including a last write identifier. At the home node: an ordered sequence of write transactions is generated based on the ordered sequence of write requests, the ordered sequence of write transactions including at least a first write transaction and a last write transaction, each write transaction having a data size equal to each write request data size; and the ordered sequence of write transactions is sent to a write combiner coupled to the home node, the last write transaction including the last write identifier. At the write combiner: the ordered sequence of write transactions is combined into a second write burst based on at least the last write identifier, the second write burst having a data size equal to the first write burst data size; and the second write burst is sent to a second device over a second connection.

In another embodiment of the method, a sum of the data sizes of the write requests in the ordered sequence of write requests equals the first write burst data size.

In another embodiment of the method, the first write burst includes a write transaction identifier, and said dividing the first write burst includes: generating a burst identifier based on the write transaction identifier; and adding the burst identifier to each write request in the ordered sequence of write requests.

In another embodiment of the method, said generating the ordered sequence of write transactions includes generating a stream identifier based on the burst identifier; and said sending the ordered sequence of write transactions includes sending the stream identifier with each write transaction in the ordered sequence of write transactions.

In another embodiment of the method, said combining the ordered sequence of write transactions is further based on the stream identifier.

In another embodiment of the method, the method further comprises: at the home node: in response to receiving the first write request, sending, to the request node, a first write response including a first data buffer identifier and an indication that the first write request is complete; and in response to receiving the last write request, sending, to the request node, a last write response including a last data buffer identifier, where a lifetime of the first write request is equal to a time between sending the first write request and receiving the first write response.

In another embodiment of the method, the method further comprises: at the write combiner: sending, to the home node, a first write transaction response including an indication that the first write transaction is complete; and sending, to the home node, a last write transaction response including an indication that the last write transaction is complete; and, at the home node: in response to receiving the last write transaction response, sending, to the request node, a final write response including an indication that the last write request is complete, where a lifetime of the last write request is equal to a time between sending the last write request and receiving the final write response.

In another embodiment of the method, the ordered sequence of write requests include one or more intermediate write requests, and the method further comprises: at the home node: in response to receiving the intermediate write request, sending, to the request node, an intermediate write response including an intermediate data buffer identifier and an indication that the intermediate write request is complete; and, at the write combiner: sending, to the home node, an intermediate write transaction response including an indication that the intermediate write transaction is complete, where a lifetime of each intermediate write request is equal to a time between sending the intermediate write request and receiving the intermediate write response, and where the lifetime of the last write request is greater than the lifetimes of the first write request and each of the intermediate write requests.

In another embodiment of the method, the first write burst is an advanced extensible interface (AXI) write burst having a data size greater than 64 bytes, each write request is an advanced microcontroller bus architecture (AMBA) coherent interconnect (CHI) write request having a data size of 64 bytes or less, each write transaction is an AXI write transaction having a data size of 64 bytes or less, and the second write burst is an AXI write burst having a data size greater than 64 bytes.

In another embodiment of the method, the request node is coupled to a first interconnect within a first system-on-chip (SoC), the home node is coupled to a second interconnect within a second SoC, the first interconnect is coupled to the second interconnect over a chip-to-chip interconnect, and the computer-based method further comprises: at a request agent coupled to the first interconnect and the chip-to-chip interconnect: receiving, from the request node over the first interconnect, the ordered sequence of write requests; and sending, over the chip-to-chip interconnect, the ordered sequence of write requests; and, at a home agent coupled to the first interconnect and the chip-to-chip interconnect: receiving, from the request agent over the chip-to-chip interconnect, the ordered sequence of write requests; and sending, to the home node over the second interconnect, the ordered sequence of write requests.

In one embodiment, a system includes an interconnect; a request node, coupled to the interconnect, including a request node processor; a home node, coupled to the interconnect, including a home node processor; and a write combiner, coupled to the home node, including a write combiner processor. The request node processor is configured to: receive, from a first device over a first connection, a first write burst having a data size; divide the first write burst into an ordered sequence of write requests based on the first write burst data size, the ordered sequence of write requests including at least a first write request and a last write request, each write request having a data size that is smaller than the first write burst data size; and send, to the home node, the ordered sequence of write requests over the interconnect, the last write request including a last write identifier. The home node processor is configured to: generate an ordered sequence of write transactions based on the ordered sequence of write requests, the ordered sequence of write transactions including at least a first write transaction and a last write transaction, each write transaction having a data size equal to each write request data size; and send, to the write combiner, the ordered sequence of write transactions, the last write transaction including the last write identifier. The home node processor is configured to: combine the ordered sequence of write transactions into a second write burst based on at least the last write identifier, the second write burst having a data size equal to the first write burst data size; and send, to a second device over a second connection, the second write burst.

In another embodiment of the system, a sum of the data sizes of the write requests in the ordered sequence of write requests equals the first write burst data size.

In another embodiment of the system, the first write burst includes a write transaction identifier, and said divide the first write burst includes: generate a burst identifier based on the write transaction identifier; and add the burst identifier to each write request in the ordered sequence of write requests.

In another embodiment of the system, said generate the ordered sequence of write transactions includes generate a stream identifier based on the burst identifier; and said send the ordered sequence of write transactions includes send the stream identifier with each write transaction in the ordered sequence of write transactions.

In another embodiment of the system, said combine the ordered sequence of write transactions is further based on the stream identifier.

In another embodiment of the system, the home node processor is further configured to: in response to receiving the first write request, send, to the request node, a first write response including a first data buffer identifier and an indication that the first write request is complete; and, in response to receiving the last write request, send, to the request node, a last write response including a last data buffer identifier, where a lifetime of the first write request is equal to a time between sending the first write request and receiving the first write response.

In another embodiment of the system, the write combiner processor is further configured to: send, to the home node, a first write transaction response including an indication that the first write transaction is complete; and send, to the home node, a last write transaction response including an indication that the last write transaction is complete; and, the home node processor is further configured to: in response to receiving the last write transaction response, send, to the request node, a final write response including an indication that the last write request is complete, where a lifetime of the last write request is equal to a time between sending the last write request and receiving the final write response.

In another embodiment of the system, the ordered sequence of write requests include one or more intermediate write requests; the home node processor is further configured to: in response to receiving the intermediate write request, send, to the request node, an intermediate write response including an intermediate data buffer identifier and an indication that the intermediate write request is complete; and, the write combiner processor is further configured to: send, to the home node, an intermediate write transaction response including an indication that the intermediate write transaction is complete, where a lifetime of each intermediate write request is equal to a time between sending the intermediate write request and receiving the intermediate write response, and where the lifetime of the last write request is greater than the lifetimes of the first write request and each of the intermediate write requests.

In another embodiment of the system, the first write burst is an advanced extensible interface (AXI) write burst having a data size greater than 64 bytes, each write request is an advanced microcontroller bus architecture (AMBA) coherent interconnect (CHI) write request having a data size of 64 bytes or less, each write transaction is an AXI write transaction having a data size of 64 bytes or less, and the second write burst is an AXI write burst having a data size greater than 64 bytes.

In another embodiment of the system, the request node is coupled to a first interconnect within a first system-on-chip (SoC), the home node is coupled to a second interconnect within a second SoC, the first interconnect is coupled to the second interconnect over a chip-to-chip interconnect, and the system further comprises: a request agent, coupled to the first interconnect and the chip-to-chip interconnect, including a request agent processor configured to: receive, from the request node over the first interconnect, the ordered sequence of write requests; and send, over the chip-to-chip interconnect, the ordered sequence of write requests; and, a home agent, coupled to the first interconnect and the chip-to-chip interconnect, including a home agent processor configured to: receive, from the request agent over the chip-to-chip interconnect, the ordered sequence of write requests; and send, to the home node over the second interconnect, the ordered sequence of write requests.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, the terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "many embodiment," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-based method for transferring data over at least one interconnect, comprising:
    at a request node coupled to an interconnect:
        receiving, from a first device over a first connection, a first write burst having a data size;
        dividing the first write burst into an ordered sequence of write requests based on the first write burst data size, the ordered sequence of write requests including at least a first write request and a last write request, each write request having a data size that is smaller than the first write burst data size;
        sending, to a home node coupled to the interconnect, the ordered sequence of write requests over the interconnect, the last write request including a last write identifier;
    at the home node:
        generating an ordered sequence of write transactions based on the ordered sequence of write requests, the ordered sequence of write transactions including at least a first write transaction and a last write transaction, each write transaction having a data size equal to each write request data size;
        sending, to a write combiner coupled to the home node, the ordered sequence of write transactions, the last write transaction including the last write identifier;
    at the write combiner:
        combining the ordered sequence of write transactions into a second write burst based on at least the last write identifier, the second write burst having a data size equal to the first write burst data size; and
        sending, to a second device over a second connection, the second write burst.

2. The computer-based method according to claim 1, where a sum of the data sizes of the write requests in the ordered sequence of write requests equals the first write burst data size.

3. The computer-based method according to claim 1, where the first write burst includes a write transaction identifier, and said dividing the first write burst includes:
    generating a burst identifier based on the write transaction identifier; and
    adding the burst identifier to each write request in the ordered sequence of write requests.

4. The computer-based method according to claim 3, where:
    said generating the ordered sequence of write transactions includes generating a stream identifier based on the burst identifier; and
    said sending the ordered sequence of write transactions includes sending the stream identifier with each write transaction in the ordered sequence of write transactions.

5. The computer-based method according to claim 4, where said combining the ordered sequence of write transactions is further based on the stream identifier.

6. The computer-based method according to claim 1, further comprising:
    at the home node:
        in response to receiving the first write request, sending, to the request node, a first write response including a first data buffer identifier and an indication that the first write request is complete; and
        in response to receiving the last write request, sending, to the request node, a last write response including a last data buffer identifier,
    where a lifetime of the first write request is equal to a time between sending the first write request and receiving the first write response.

7. The computer-based method according to claim 6, further comprising:
    at the write combiner:
        sending, to the home node, a first write transaction response including an indication that the first write transaction is complete;

sending, to the home node, a last write transaction response including an indication that the last write transaction is complete; and at the home node:
in response to receiving the last write transaction response, sending, to the request node, a final write response including an indication that the last write request is complete, where a lifetime of the last write request is equal to a time between sending the last write request and receiving the final write response.

8. The computer-based method according to claim 7, where the ordered sequence of write requests include one or more intermediate write requests, and the method further comprises:

at the home node:
in response to receiving the intermediate write request, sending, to the request node, an intermediate write response including an intermediate data buffer identifier and an indication that the intermediate write request is complete; and at the write combiner:
sending, to the home node, an intermediate write transaction response including an indication that the intermediate write transaction is complete, where a lifetime of each intermediate write request is equal to a time between sending the intermediate write request and receiving the intermediate write response, and where the lifetime of the last write request is greater than the lifetimes of the first write request and each of the intermediate write requests.

9. The computer-based method according to claim 1, where the first write burst is an advanced extensible interface (AXI) write burst having a data size greater than 64 bytes, each write request is an advanced microcontroller bus architecture (AMBA) coherent interconnect (CHI) write request having a data size of 64 bytes or less, each write transaction is an AXI write transaction having a data size of 64 bytes or less, and the second write burst is an AXI write burst having a data size greater than 64 bytes.

10. The computer-based method according to claim 1, where the request node is coupled to a first interconnect within a first system-on-chip (SoC), the home node is coupled to a second interconnect within a second SoC, the first interconnect is coupled to the second interconnect over a chip-to-chip interconnect, and the computer-based method further comprises:

at a request agent coupled to the first interconnect and the chip-to-chip interconnect:
receiving, from the request node over the first interconnect, the ordered sequence of write requests;
sending, over the chip-to-chip interconnect, the ordered sequence of write requests;

at a home agent coupled to the first interconnect and the chip-to-chip interconnect:
receiving, from the request agent over the chip-to-chip interconnect, the ordered sequence of write requests; and
sending, to the home node over the second interconnect, the ordered sequence of write requests.

11. A system, comprising:
an interconnect;
a request node, coupled to the interconnect, including a request node processor;
a home node, coupled to the interconnect, including a home node processor; and
a write combiner, coupled to the home node, including a write combiner processor, where the request node processor is configured to:
receive, from a first device over a first connection, a first write burst having a data size,
divide the first write burst into an ordered sequence of write requests based on the first write burst data size, the ordered sequence of write requests including at least a first write request and a last write request, each write request having a data size that is smaller than the first write burst data size,
send, to the home node, the ordered sequence of write requests over the interconnect, the last write request including a last write identifier, where the home node processor is configured to:
generate an ordered sequence of write transactions based on the ordered sequence of write requests, the ordered sequence of write transactions including at least a first write transaction and a last write transaction, each write transaction having a data size equal to each write request data size,
send, to the write combiner, the ordered sequence of write transactions, the last write transaction including the last write identifier, where the home node processor is configured to:
combine the ordered sequence of write transactions into a second write burst based on at least the last write identifier, the second write burst having a data size equal to the first write burst data size, and
send, to a second device over a second connection, the second write burst.

12. The system according to claim 11, where a sum of the data sizes of the write requests in the ordered sequence of write requests equals the first write burst data size.

13. The system according to claim 11, where the first write burst includes a write transaction identifier, and said divide the first write burst includes:
generate a burst identifier based on the write transaction identifier; and
add the burst identifier to each write request in the ordered sequence of write requests.

14. The system according to claim 13, where:
said generate the ordered sequence of write transactions includes generate a stream identifier based on the burst identifier; and
said send the ordered sequence of write transactions includes send the stream identifier with each write transaction in the ordered sequence of write transactions.

15. The system according to claim 14, where said combine the ordered sequence of write transactions is further based on the stream identifier.

16. The system according to claim 11, where the home node processor is further configured to:
in response to receiving the first write request, send, to the request node, a first write response including a first data buffer identifier and an indication that the first write request is complete; and
in response to receiving the last write request, send, to the request node, a last write response including a last data buffer identifier, where a lifetime of the first write request is equal to a time between sending the first write request and receiving the first write response.

17. The system according to claim 16, where:
the write combiner processor is further configured to:

send, to the home node, a first write transaction response including an indication that the first write transaction is complete;

send, to the home node, a last write transaction response including an indication that the last write transaction is complete; and the home node processor is further configured to:

in response to receiving the last write transaction response, send, to the request node, a final write response including an indication that the last write request is complete, where a lifetime of the last write request is equal to a time between sending the last write request and receiving the final write response.

18. The system according to claim 17, where:

the ordered sequence of write requests include one or more intermediate write requests;

the home node processor is further configured to:

in response to receiving the intermediate write request, send, to the request node, an intermediate write response including an intermediate data buffer identifier and an indication that the intermediate write request is complete;

the write combiner processor is further configured to:

send, to the home node, an intermediate write transaction response including an indication that the intermediate write transaction is complete;

a lifetime of each intermediate write request is equal to a time between sending the intermediate write request and receiving the intermediate write response; and the lifetime of the last write request is greater than the lifetimes of the first write request and each of the intermediate write requests.

19. The system according to claim 11, where the first write burst is an advanced extensible interface (AXI) write burst having a data size greater than 64 bytes, each write request is an advanced microcontroller bus architecture (AMBA) coherent interconnect (CHI) write request having a data size of 64 bytes or less, each write transaction is an AXI write transaction having a data size of 64 bytes or less, and the second write burst is an AXI write burst having a data size greater than 64 bytes.

20. The system according to claim 11, where the request node is coupled to a first interconnect within a first system-on-chip (SoC), the home node is coupled to a second interconnect within a second SoC, the first interconnect is coupled to the second interconnect over a chip-to-chip interconnect, and the system further comprises:

a request agent, coupled to the first interconnect and the chip-to-chip interconnect, including a request agent processor configured to:

receive, from the request node over the first interconnect, the ordered sequence of write requests;

send, over the chip-to-chip interconnect, the ordered sequence of write requests; and a home agent, coupled to the first interconnect and the chip-to-chip interconnect, including a home agent processor configured to:

receive, from the request agent over the chip-to-chip interconnect, the ordered sequence of write requests; and send, to the home node over the second interconnect, the ordered sequence of write requests.

* * * * *